US008649649B2

(12) United States Patent
Smith et al.

(10) Patent No.: US 8,649,649 B2
(45) Date of Patent: Feb. 11, 2014

(54) FIBER DISTRIBUTION HUB WITH CONNECTORIZED STUB CABLES

(75) Inventors: Trevor D. Smith, Eden Prarie, MN (US); Thomas G. LeBlanc, Westminster, MA (US); Soutsada Vongseng, Chanhassen, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 280 days.

(21) Appl. No.: 13/040,053

(22) Filed: Mar. 3, 2011

(65) Prior Publication Data

US 2011/0217015 A1 Sep. 8, 2011

Related U.S. Application Data

(60) Provisional application No. 61/310,214, filed on Mar. 3, 2010.

(51) Int. Cl.
G02B 6/00 (2006.01)
(52) U.S. Cl.
USPC .......................................... 385/136; 385/135
(58) Field of Classification Search
None
See application file for complete search history.

(56) References Cited

U.S. PATENT DOCUMENTS

| 4,747,020 A | 5/1988 | Brickley et al. |
|---|---|---|
| 4,765,710 A | 8/1988 | Burmeister et al. |
| 4,792,203 A | 12/1988 | Nelson et al. |
| 4,995,688 A | 2/1991 | Anton et al. |
| 5,100,221 A | 3/1992 | Carney et al. |
| 5,129,030 A | 7/1992 | Petrunia |
| 5,179,618 A | 1/1993 | Anton |
| 5,214,730 A | 5/1993 | Nagasawa et al. |
| 5,274,731 A | 12/1993 | White |
| 5,289,558 A | 2/1994 | Teichler et al. |
| 5,363,465 A | 11/1994 | Korkowski et al. |
| 5,367,598 A | 11/1994 | Devenish, III et al. |
| RE34,955 E | 5/1995 | Anton et al. |
| 5,442,726 A | 8/1995 | Howard et al. |
| 5,448,015 A | 9/1995 | Jamet et al. |
| 5,497,444 A | 3/1996 | Wheeler |
| 5,511,144 A | 4/1996 | Hawkins et al. |
| 5,636,138 A | 6/1997 | Gilbert et al. |
| 5,708,751 A | 1/1998 | Mattei |
| 5,717,810 A | 2/1998 | Wheeler |
| 5,784,515 A | 7/1998 | Tamaru et al. |
| 5,823,646 A | 10/1998 | Arizpe et al. |
| 5,945,633 A | 8/1999 | Ott et al. |
| 6,044,193 A | 3/2000 | Szentesi et al. |
| 6,061,492 A | 5/2000 | Strause et al. |
| 6,160,946 A | 12/2000 | Thompson et al. |
| 6,208,796 B1 | 3/2001 | Williams Vigliaturo |
| 6,236,795 B1 | 5/2001 | Rodgers |
| 6,256,443 B1 | 7/2001 | Uruno et al. |
| 6,278,829 B1 | 8/2001 | BuAbbud et al. |
| RE37,489 E | 1/2002 | Anton et al. |
| 6,356,697 B1 | 3/2002 | Braga et al. |
| 6,363,200 B1 | 3/2002 | Thompson et al. |

(Continued)

*Primary Examiner* — Jerry Rahll
(74) *Attorney, Agent, or Firm* — Merchant & Gould P.C.

(57) ABSTRACT

A fiber distribution hub includes an enclosure; a splitter region; a termination region including a plurality of adapters; at least a first feeder stub cable; and at least a first subscriber stub cable routed into the enclosure. The subscriber cable includes at least two optical fibers that each have a connectorized end inserted into one of the adapters at the termination region. The subscriber cable is terminated at a remote end by a multi-fiber connector.

16 Claims, 22 Drawing Sheets

(56) References Cited

U.S. PATENT DOCUMENTS

| | | |
|---|---|---|
| 6,385,381 B1 | 5/2002 | Janus et al. |
| 6,424,781 B1 | 7/2002 | Puetz et al. |
| 6,434,313 B1 | 8/2002 | Clapp, Jr. et al. |
| 6,487,358 B1 * | 11/2002 | Gehrke et al. ............... 385/136 |
| 6,535,682 B1 | 3/2003 | Puetz et al. |
| 6,556,763 B1 | 4/2003 | Puetz et al. |
| 6,621,975 B2 | 9/2003 | Laporte et al. |
| 6,631,237 B2 | 10/2003 | Knudsen et al. |
| 6,661,961 B1 | 12/2003 | Allen et al. |
| 6,760,530 B1 | 7/2004 | Mandry |
| 6,760,531 B1 | 7/2004 | Solheid et al. |
| 6,778,752 B2 | 8/2004 | Laporte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,968,111 B2 | 11/2005 | Trebesch et al. |
| 6,980,725 B1 | 12/2005 | Swieconek |
| 6,983,095 B2 | 1/2006 | Reagan et al. |
| 7,086,539 B2 | 8/2006 | Knudsen et al. |
| 7,088,893 B2 | 8/2006 | Cooke et al. |
| 7,088,899 B2 | 8/2006 | Reagan et al. |
| 7,103,255 B2 | 9/2006 | Reagan et al. |
| 7,120,347 B2 | 10/2006 | Blackwell, Jr. et al. |
| 7,127,143 B2 | 10/2006 | Elkins, II et al. |
| 7,139,461 B2 | 11/2006 | Puetz et al. |
| 7,142,764 B2 | 11/2006 | Allen et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,264,402 B2 | 9/2007 | Theuerkorn et al. |
| 7,277,620 B2 | 10/2007 | Vongseng et al. |
| 7,333,707 B2 | 2/2008 | Puetz et al. |
| 7,369,741 B2 | 5/2008 | Reagan et al. |
| 7,407,330 B2 | 8/2008 | Smith et al. |
| 7,418,181 B2 | 8/2008 | Zimmel et al. |
| 7,457,503 B2 | 11/2008 | Solheid et al. |
| 7,471,869 B2 | 12/2008 | Reagan et al. |
| 7,519,258 B2 | 4/2009 | Wilken et al. |
| 7,539,388 B2 | 5/2009 | Mertesdorf et al. |
| 7,623,749 B2 | 11/2009 | Reagan et al. |
| 7,646,958 B1 | 1/2010 | Reagan et al. |
| 7,693,374 B2 | 4/2010 | Cody et al. |
| 2002/0150372 A1 | 10/2002 | Schray |
| 2004/0014367 A1 | 1/2004 | Petersen |
| 2005/0259928 A1 | 11/2005 | Elkins, II et al. |
| 2010/0310226 A1 * | 12/2010 | Wakileh et al. ............... 385/139 |
| 2010/0322568 A1 * | 12/2010 | Zimmel et al. ............... 385/81 |

* cited by examiner

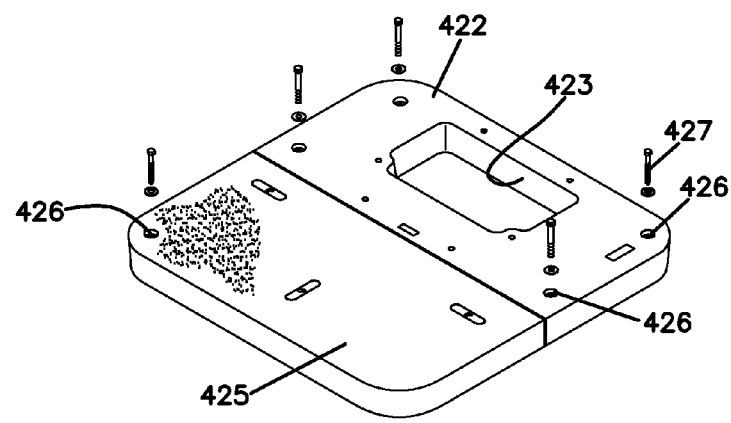
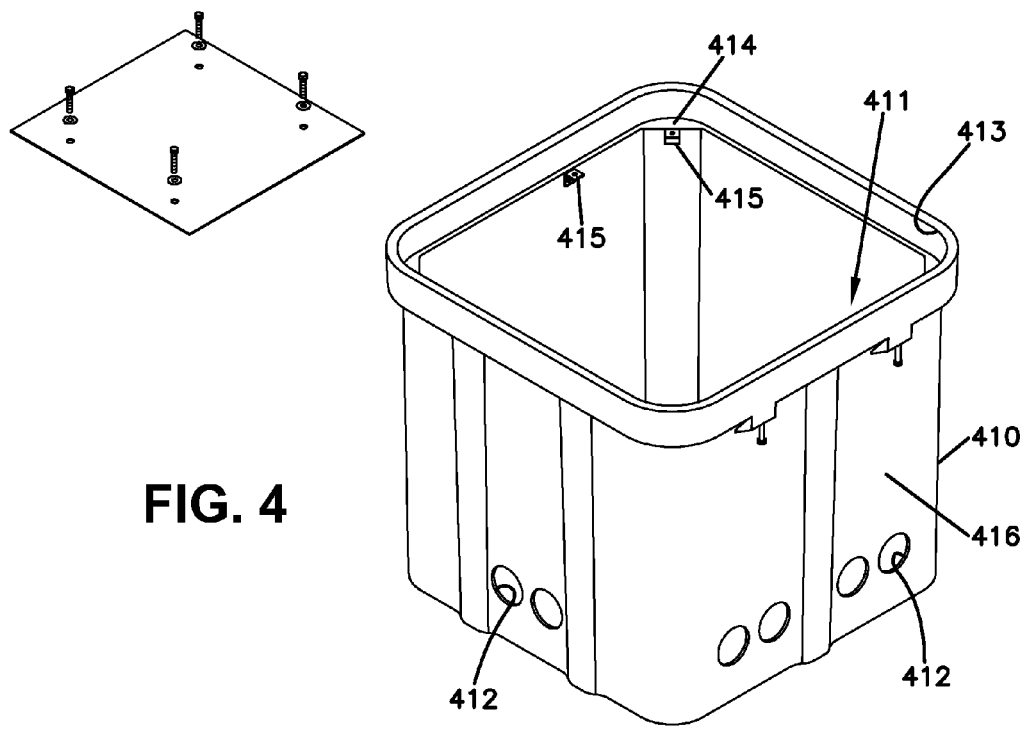

US 8,649,649 B2

FIBER DISTRIBUTION HUB WITH CONNECTORIZED STUB CABLES

CROSS-REFERENCE TO RELATED APPLICATIONS

This application claims the benefit of U.S. Provisional Application No. 61/310,214, filed Mar. 3, 2010, and titled "Fiber Distribution Hub with Connectorized Stub Cables," the disclosure of which is hereby incorporated by reference herein.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

An example network can include a central office that connects a number of end subscribers (also called end users herein) in a network. For example, FIG. 1 is a schematic diagram of a network 100 including a central office 110 that connects a number of subscribers 115 in the network 100. The central office can additionally connect to one or more larger networks, such as the Internet (not shown) and a public switched telephone network (PSTN).

Some cables in the network 100 can be branched out from main cable lines 120 and routed to fiber distribution and access terminals (e.g., fiber distribution hubs or pedestals). For example, feeder cables can branch from main cable lines 120 at branch points 125 and be routed to FDHs 130. Such branched cables might extend from the FDHs 130 to smaller fiber access terminals (e.g., optical network terminals or drop terminals) 104 directly adjacent the business or home to which service may be provided. The various lines of the network can be aerial or housed within underground conduits.

Splitters used in FDHs 130 can accept feeder cables having a number of fibers and may split signals carried on those incoming fibers into, for example, 216 to 432 individual signals that may be associated with a like number of end user locations 115. In typical applications, an optical splitter is provided prepackaged in an optical splitter module housing and provided with splitter output pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to fiber distribution and access terminals as required.

Improvements to current fiber networks are desirable.

SUMMARY

Certain aspects of the disclosure relate to fiber distribution hubs (FDHs) that provide an interface between the central office 110 and the end users 115. Certain aspects of the disclosure relate to features that facilitate deployment of the FDH. Other aspects relate to features that enhance cable management, ease of use, and scalability.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

Referring to the drawing, wherein like numerals represent like parts throughout the several views:

FIGS. 4-6 show an example handhole in accordance with aspects of the present disclosure;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

A fiber distribution hub (FDH) generally administers connections between incoming fiber and outgoing fiber in an Outside Plant (OSP) environment. In general, the FDH includes a termination region at which incoming fibers can communicatively connect to the outgoing fibers. In other embodiments, some incoming fibers can connect directly to the outgoing fibers without passing through the termination region. Implementations of the FDH also can provide storage regions, splitter regions, and/or splice regions, each of which will be described in greater detail herein.

As the term is used herein, "a connection" between fibers may include direct connections and/or indirect connections. Examples of incoming fibers include feeder cable fibers, which enter the FDH, and intermediate fibers (e.g., connectorized pigtails extending from splitters and patching fibers/jumpers) that connect the feeder cable fibers to the termination region. Examples of outgoing fibers include distribution cable fibers, which exit the FDH, and any intermediate fibers that connect the distribution cable fibers to the termination region.

The FDH provides an interconnect interface for optical transmission signals at a location in the network where operational access and reconfiguration are desired. For example, as noted above, the FDH can be used to split feeder cables and to terminate the split feeder cables to distribution cables routed to subscriber locations. In other implementations, the FDH can provide a splice interface to couple feeder cables to the distribution cables directly. The FDH also can provide storage of incoming fibers before connection to the outgoing cable fibers.

An example feeder cable may include one to forty-eight individual fibers. In different implementations, the feeder cable can include two, eight, twelve, twenty-four, and forty-eight fibers. In accordance with one aspect of the disclosure, the feeder cable 301 is connected to a service provider central office 110 (e.g., forms the F1 portion of the network 100) (see FIG. 1). Example distribution cables include multiple fibers (e.g., 12, 48, 96, 144, 216, 288, 432, or 576 fibers) and form the F2 portion of a network (see FIG. 1). The distribution cables are routed from the FDH to subscriber locations or to other locations within the network 100. In addition, the FDH can be designed to accommodate a range of alternative sizes and fiber counts and to support factory installation of pigtails, fanouts, and optical splitters.

Figure 2:
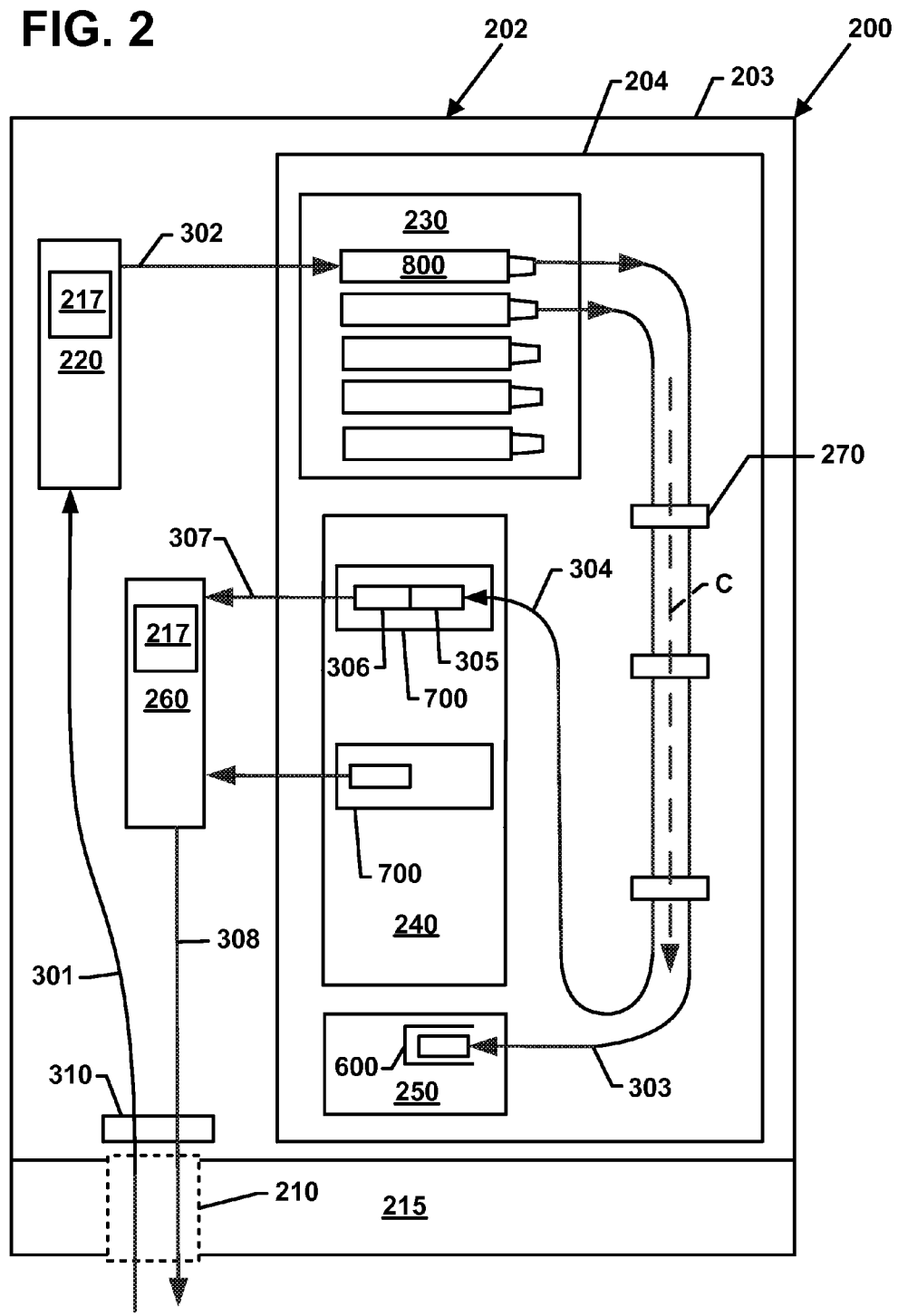
FIG. 2 is a schematic diagram of an example cable routing scheme in an example FDH in accordance with aspects of the present disclosure.

One example FDH 200 is shown schematically in FIG. 2. The FDH 200 includes an enclosure (e.g., a cabinet, a frame, etc.) 202 configured to support telecommunications components. For example, in accordance with some aspects, an example enclosure 202 can accommodate one or more splitter modules 800, one or more termination modules 700, and one or more storage modules 600. The enclosure 202 is mounted on an access module 215 that is mounted to a support panel or platform, which will be described in more detail herein.

As shown at FIG. 2, at least one feeder cable 301 and at least one subscriber cables 308 can be routed through the access module 215 and into the enclosure 202 through a cable port 210 defined in the enclosure 202 (e.g., typically through the back or bottom of the enclosure). In some implementations, at least two subscriber cables 308 are routed into the enclosure 202 (e.g., see FIG. 3). For example, in different implementations, four, eight, twelve, sixteen, or twenty-four, thirty-six, forty-eight, or other number of subscriber cables 308 can be routed into the enclosure 202. In accordance with some aspects, the cables 301, 308 are secured to the enclosure 202 at the cable port 210 by a cable clamp 310.

One or more fibers 302 of the feeder cable 301 can be routed from the cable port 210 to a first fiber interface 220 positioned within the enclosure 202. In accordance with some aspects of the disclosure, the first fiber interface 220 includes one or more fanout modules 217. Fibers 302 of the feeder cable 301 are separated out into individual fibers at the fanout module 217. In some implementations, the fibers 302 are upjacketed (e.g., into buffer tubes) or otherwise protected at the fanout modules 217. In such embodiments, the fibers 302 have connectorized ends that are routed to a splitter region 230. In accordance with other aspects of the disclosure, the first fiber interface 220 can include one or more splice trays, adapters, or adapter modules at which the fibers 302 can be optically coupled to splitter input fibers (not shown), which are routed to the splitter region 230.

At the splitter region 230, the fibers 302 (or splitter input fibers) are connected to separate splitter modules 800, at which signals carried over the fibers 302 are each split into multiple signals carried over connectorized splitter pigtails 303, 304. A typical splitter pigtail 303, 304 includes a coated (and possibly buffered) fiber, a jacket covering the fiber, and strength members (e.g., aramid yarn) positioned between the fiber and the jacket. In FIG. 2, reference number 303 denotes splitter pigtails that are not in service and reference number 304 denotes splitter pigtails that are in service.

When the splitter pigtails 303 are not in service, the connectorized ends 305 of the splitter pigtails 303 can be temporarily stored on a storage region 250. For example, the connectorized ends 305 of the splitter pigtails 303 can be held at storage modules 900 positioned at the storage region 250. When the pigtails 304 are needed for service, the pigtails 304 are routed from the splitter region 230 to a termination field 240. For example, the connectorized ends 305 of the splitter pigtails 304 can be plugged into termination modules 800.

In accordance with some implementations, the splitter region 230 is positioned so that the splitter pigtails 303, 304 are routed along a vertical channel C between the splitter region 230 and the termination field 240 or storage region 250. In certain embodiments, the vertical channel C is defined by one or more retaining members 270. In certain embodiments, the retaining members 270 include two members that cooperate to wrap around the splitter pigtails 303, 304. For example, ends of the two members can fasten together via VELCRO®, a snap-fit engagement, or via another securement arrangement.

One or more fibers 307 of the subscriber cable 308 are routed from the cable port 210 to a second fiber interface 260 positioned within the enclosure 202. In accordance with some aspects of the disclosure, the second fiber interface 260 includes one or more fanout modules 217. Fibers 307 of the subscriber cable 308 are separated out into individual fibers at the fanout module 217. In some implementations, the fibers 307 are upjacketed (e.g., into buffer tubes) or otherwise protected at the fanout modules 217. In such embodiments, the fibers 307 have connectorized ends 306 that are routed to a termination region 240. In accordance with other aspects of the disclosure, the second fiber interface 260 can include one or more splice trays, adapters, or adapter modules at which the fibers 307 can be optically coupled to intermediate fibers (not shown), which are routed to the termination region 240.

The termination region 240 is the dividing line between the incoming fibers and the outgoing fibers of the FDH 200. In accordance with some aspects, the connectorized ends 305 of the splitter pigtails 304 are connected to connectorized ends 306 of the fibers 307 of the subscriber cable 308 at the termination field 240. In accordance with other aspects, the connectorized ends 305 of the splitter pigtails 304 are connected to connectorized ends of intermediate fibers (not shown) that optically couple to the fibers 307 of the subscriber cable 308. For example, in one implementation, the intermediate fibers may be spliced to fibers 307 of the subscriber cable 308.

Figure 1:
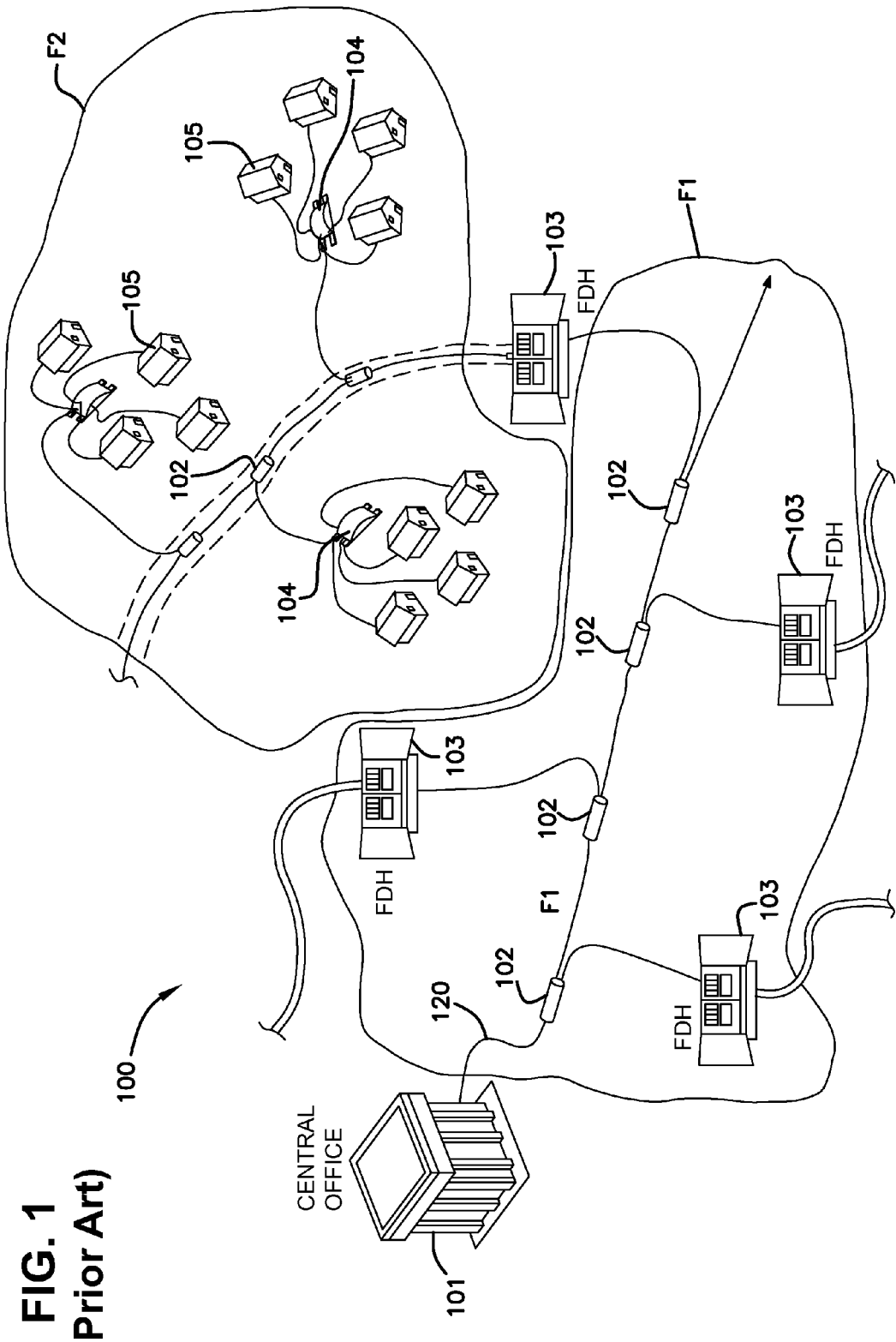
FIG. 1 illustrates a network deploying passive fiber optic lines and including a central office that connects a number of end subscribers (also called end users herein) in a network in accordance with the principles of the present disclosure.

In certain implementations, one or more fibers 302 of the feeder cable 301 are not optically coupled to the splitter modules 800. For example, in some embodiments, one or more of the feeder fibers 302 can be routed directly to the termination field 240 to optically connect to the subscriber fibers 307 (or intermediate fibers). In accordance with aspects of the disclosure, the feeder cable fibers 302 can be routed to the same side of the termination field 240 as the splitter pigtails 303. By refraining from splitting the signal carried by the fiber 302, a stronger signal can be sent to one of the subscribers 115 (FIG. 1).

In certain implementations, the enclosure 202 defines an interior in which a frame 204 is mounted. In accordance with some aspects, the frame 204 is moveably (e.g., pivotally) mounted to the enclosure 202 to enable the frame 230 to move relative to the enclosure 202. In some implementations, one or more of the telecommunications components can be mounted to the frame 204. For example, in one implementation, the splitter region 230, the termination region 240, and the storage region 250 can be mounted to the frame 204. In another implementation, one or both of the interface regions 210, 260 can be mounted to the frame 204. In other implementations, however, one or more of the telecommunications components can be mounted to a main body 203 of the enclosure 202 instead of to the frame 204. Further details regarding moveable inner frames can be found in U.S. Pat. No. 7,369,741, issued to Reagan et al. and titled Storage Adapter with Dust Cap Post, the disclosure of which is hereby incorporated by reference herein.

Figure 3:
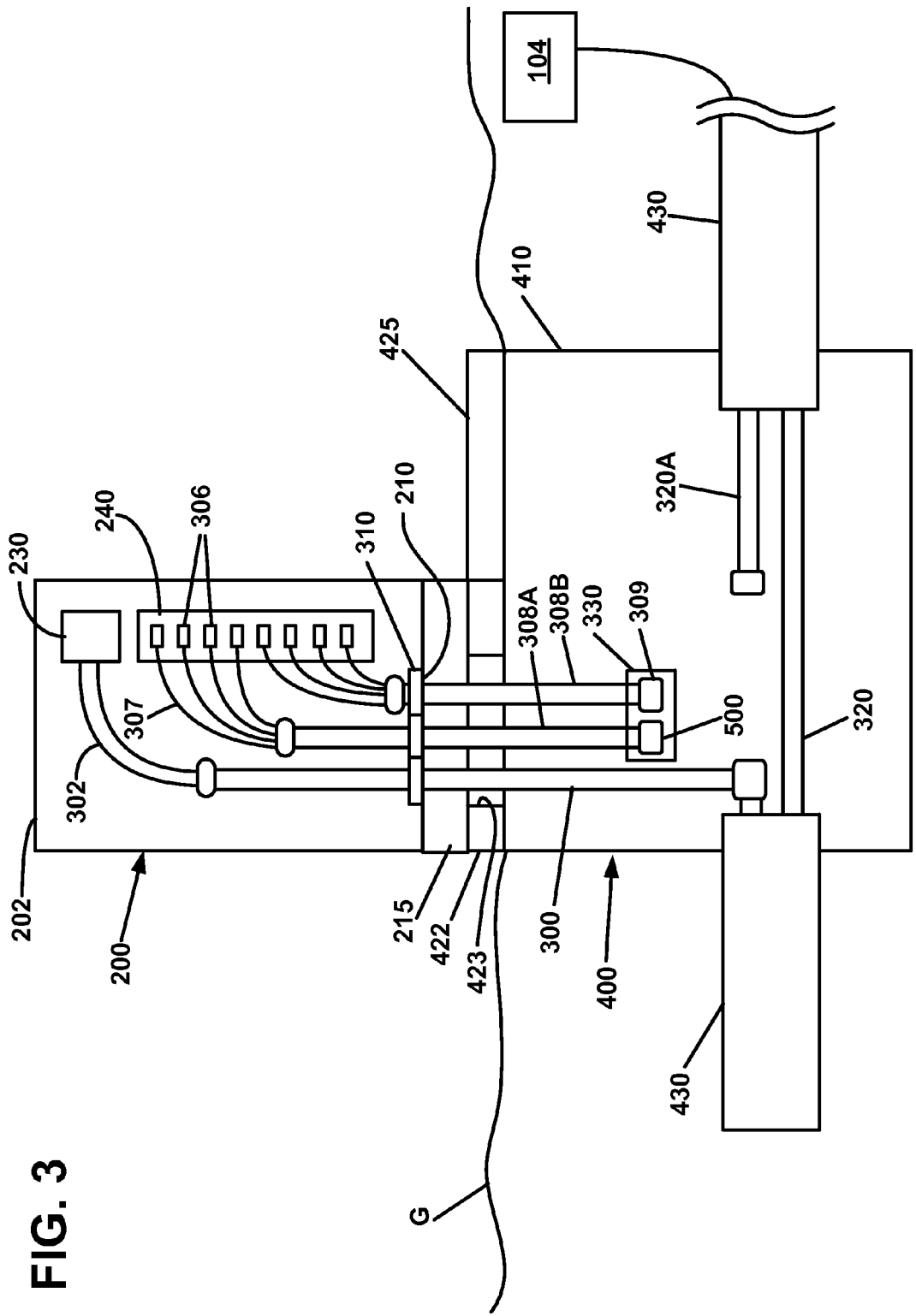
FIG. 3 is a schematic diagram of an example FDH mounted over an example handhole in accordance with aspects of the present disclosure.

FIG. 3 is a schematic drawing of an example FDH 200 mounted over an example handhole 400 positioned in the ground G beneath the FDH 200. The handhole 400 includes a container structure 410 that is buried below ground G and into which at least one conduit 430 is routed. The conduits 430 are configured to route telecommunications cables 320 of the telecommunications network 100 to different locations in the network. In some implementations, a single conduit 430 passes through the handhole container 410. In other implementations, multiple conduits 430 can pass through the handhole container 410. At least one of the conduits 430 provides an access point at which one or more cables 320 can be routed from the conduit 430 to the FDH 200. In still other implementations, multiple conduits 430 terminate at the container interior.

The handhole 400 includes at least one support panel or platform 412 on which the FDH 200 can be mounted. For example, the access module 215 can be secured to the support platform 412 and the FDH enclosure 202 can be mounted to the access module 215. The support platform 412 is mounted to a top of the container 410, e.g., as described in more detail herein. The panel 412 defines a cable port 413 through which the feeder cable(s) 301 and the subscriber cable(s) 308 pass from the handhole container 410 into the enclosure 202. The cable port 413 of the handhole panel 412 aligns with the cable port 210 of the enclosure 202.

In accordance with certain aspects of the disclosure, the feeder cable 301 and the subscriber cables 308 are stubs cables that are precabled within the enclosure 202 prior to deployment of the FDH 200. For example, the connectorized ends 306 of the fibers 307 of the subscriber cables 309 can be plugged into adapters at the termination field 240 within the enclosure at a factory or other manufacturing site. The feeder cable fibers 302 also can be routed to the splitter region 230 or to the first interface region 220 at the factory.

The other ends (also referred to as "stub ends") of the cables 301, 308 extend out from the enclosure 202 through the cable port 210. For example, in some implementations, the stub ends can extend about five to ten feet out from the enclosure 202. In other implementations, however, the stub cables 301, 308 can be longer or shorter. During deployment of the FDH 200, the stub ends of the cables 301, 308 are routed into the handhole container 410 through the cable port 413. Within the handhole container 410, the feeder cable 301 and the subscriber cables 308 can be optically coupled to one or more of the cables 320 being routed through the conduits 430.

In accordance with some aspects, stub ends 309 of the subscriber cables 308 are connectorized. For example, the stub end 309 of at least one subscriber cable 308 can be terminated with a multi-fiber connector (MFC) 500, which is described in more detail below. In some such implementations, at least one cable 320A being routed through the conduit 430 also is terminated with an MFC. In such implementations, the MFC 500 of the subscriber stub cable 308 can be interfaced (e.g., directly or through an adapter) with the MFC of the cable 320A to connect the subscriber stub cable 308 to subsequent points in the network 100 (drop terminals 104, other fiber distribution hubs 130, subscriber locations 115, etc.). In accordance with other aspects, each fiber 307 of the subscriber cable 308 is connectorized at both ends to facilitate connection to connectorized fibers within the cables 320 passing through the conduits 430.

In accordance with some aspects, one or more of the feeder stub cables 301 has a connectorized end routed into the interior of the handhole container 410. For example, one or more of the feeder stub cables 301 can be terminated with an MFC 500, which is described in more detail below. In some such implementations, at least one cable 320 being routed through the conduit 430 also is terminated with an MFC. In such implementations, the MFC 500 of the feeder stub cable 301 can be interfaced (e.g., directly or through an adapter) with the MFC of the cable to connect the feeder stub cable 301 to prior points in the network 100 (central office 110, other fiber distribution hubs 130, etc.).

Figure 6:
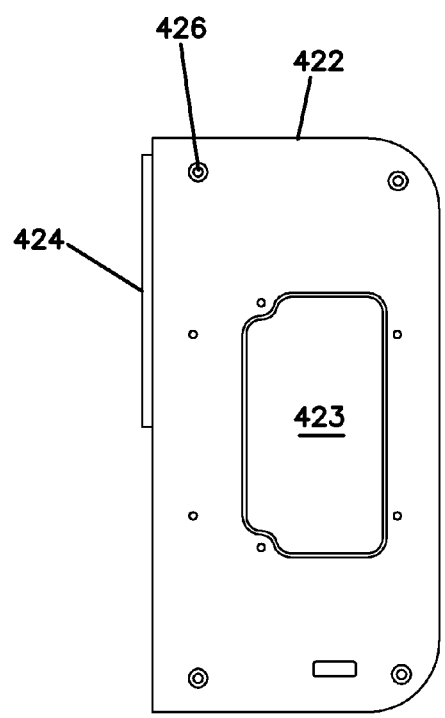

An example handhole 400 is shown in FIGS. 4-6. FIG. 4 is a top, perspective view of an example handhole container 410 having an open top 413 leading to an interior 411. Through holes 412 are defined within the side walls 416 of the container 410. The through holes 412 are sized and shaped to enable conduits 430 to enter and exit the container interior 411. In the example shown, at least one side wall 416 defines two through holes 412 and at least one side wall 416 defines four through holes 412. In some implementations, opposing side walls 416 can define a like number of through holes 412 to enable conduits 430 to pass fully through the container 410. In other implementations, opposing side walls 416 can each define a different number of through holes 412 (including zero).

The container 410 defines shoulders 414 within the interior 411 just below the open top 413. In the example shown, the shoulders 414 are provided at the corners of the container 410. In other example implementations, however, the shoulders 414 also can be provided along the sides of the container 410. The support platform 422 is configured to seat on the shoulders 414 at the open top 413 of the container 410. Brackets 415 or other supporting hardware can be provided on the container 410 for securing the support platform 422 to the container 410.

One example support panel 422 is shown in FIG. 5. The support panel 422 defines a cable port 423 that provides access to the interior 411 of the container 410. The support panel 422 also defines through openings 426 through which fasteners (e.g., screws, bolts, rivets, etc.) 427 can extend to secure the support panel 422 to the brackets 415 within the container 410. Typically, the support platform 422 extends over only a portion of the open top 413 of the container 410.

Accordingly, one or more brackets 415 can be positioned along the sides of the open top 413 of the container 410 (see FIG. 4).

The handhole 400 also includes one or more access panels 425 that cover the remainder of the open top 413 to provide selective access to the interior 411 of the container 410. The access panel 425 is configured to seat on the support members 414 at the open top 413 of the container 410. In one implementation, the support platform 422 includes a step 414 protruding outwardly to provide further support for the access panel 425 (see FIG. 6). In one implementation, the access panel 425 also defines at least one through opening 426 through which a fastener can extend to secure the access panel 425 to the top 413 of the container 410.

Typically, the fastener that secures the access panel 425 to the container 410 is removable. Accordingly, the access panel 425 can be moved to enable a technician to access the interior 411 of the container 410. In one implementation, the access panel 425 is configured to be lifted up and fully removed from the open top 413 of the container 410 when access to the container interior 411 is desired. In another implementation, the access panel 425 is configured to be pivoted upwards to provide access to the container interior 411.

Figure 7:
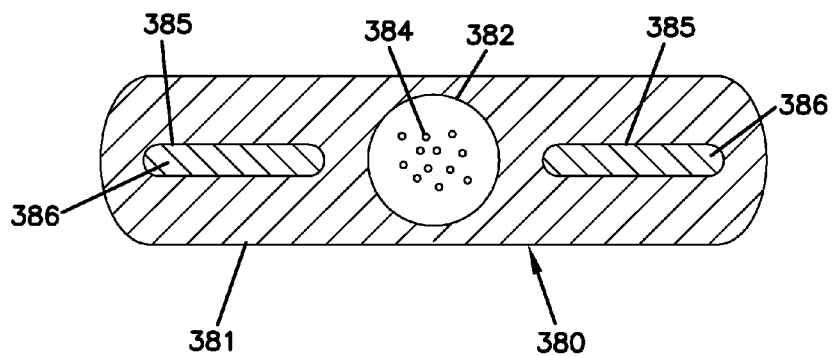
FIGS. 7 and 8 show a first example implementation of an optical cable suitable for use as a feeder cable and/or a subscriber stub cable described herein.
Figure 8:
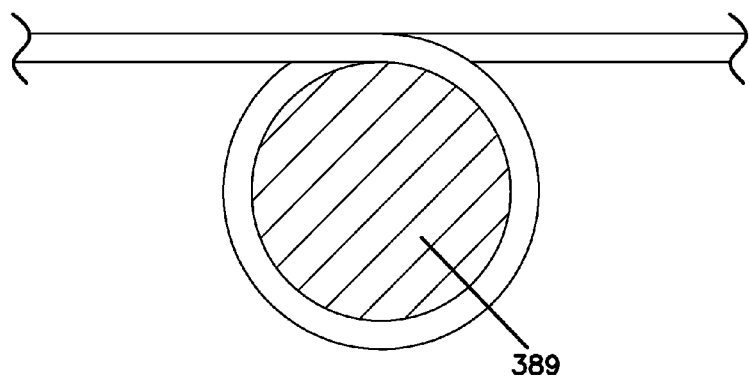

FIGS. 7 and 8 show a first example implementation of an optical cable 380 suitable for use as a feeder cable 300 and/or a subscriber stub cable 308 described herein. The first example cable 380 includes an outer jacket 381 defining at least a first passage 382 for containing at least one optical fiber 384 and at least a second passage 385 for containing at least one strength member 386. In one implementation, the outer jacket 381 includes a central passage 382 for containing optical fibers 384 and two passages 385 on opposite sides of the central passage 384 for containing strength members 386. In other implementations, the first example cable 380 can include greater or fewer strength members 386 enclosed within the jacket 381.

In accordance with some aspects, the first example cable 380 has an elongated transverse cross-sectional profile (e.g., a flattened cross-sectional profile, an oblong cross-sectional profile, an obround cross-sectional profile, etc.) defined by the outer jacket 381. The major axis and the minor axis of the cross-sectional profile intersect perpendicularly at a lengthwise axis of the cable 380. The construction of the first example cable 380 allows the cable 380 to be bent more easily along a plane that coincides with the minor axis than along a plane that coincides with the major axis. Such a construction allows the first example cable 380 to be readily used for applications in which drop cables are normally used and also allows the first example cable 380 to be wrapped around a cable storage spool having a relatively small diameter without damaging the example cable 380. Other implementations of the first example cable 380 can have round, oval, or other transverse cross-sectional profiles, however.

In accordance with some aspects, the outer jacket 381 can be shaped through an extrusion process and can be made by any number of different types of polymeric materials. In certain embodiments, the outer jacket 381 can have a construction the resists post-extrusion shrinkage of the outer jacket 381. For example, the outer jacket 381 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket 381.

In some implementations, the first passage 382 of the outer jacket 381 is sized to receive one or more of the bend insensitive fibers 384. The bend insensitive fibers 384 are preferably unbuffered and in certain embodiments have outer diameters in the range of 230-270 μm. In one implementation, the first passage 382 is sized to receive at least twelve of the bend insensitive fibers 384. When the fibers 384 are positioned within the first passage 382, it is preferred for the fibers 384 to occupy less than 60% of the total transverse cross-sectional area defined by the first passage 382. In some implementations, structures such water-swellable fibers, water-swellable tape, or water-swellable yarn can be provided within the passage 382 to prevent water from migrating along the first passage 382. In other implementations, water-blocking gel may be provided within the first passage 382.

In accordance with some implementations, the strength members 386 of the first example cable 380 have a transverse cross-sectional profile that matches the transverse cross-sectional profile of the second passage 385. In one implementation, each strength members 386 has a width that is greater than a thickness of the strength member 386. In certain implementations, the strength members 386 are bonded to the outer jacket 381. For example, the bonding between the strength members 386 and the outer jacket 381 can be chemical bonding or thermal bonding.

In accordance with some aspects, each strength members 386 has a construction that is highly flexible and highly strong in tension. For example, in certain implementations, the strength members 386 provide the vast majority of the tensile load capacity of the first example cable 380. In certain implementations, each strength member 386 also has a flexibility that allows the strength member 386 to be wrapped at least 360 degrees around a mandrel 389 (see FIG. 8) having a 10 millimeter outer diameter for one hour without undergoing/experiencing meaningful deterioration/degradation of the tensile strength properties of the strength member 386.

In certain embodiments, the strength member 386 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, the strength member 386 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

Additional details regarding the example first cable segment 110 can be found in U.S. application Ser. No. 12/607,748, filed Oct. 28, 2009, published as US 2010/0278493, and titled "Flat Drop Cable," the disclosure of which is hereby incorporated herein by reference in its entirety. Of course, other types of fiber optic cables having different tensile strength and flexibility characteristics can be used as the first cable segment.

Figure 9:
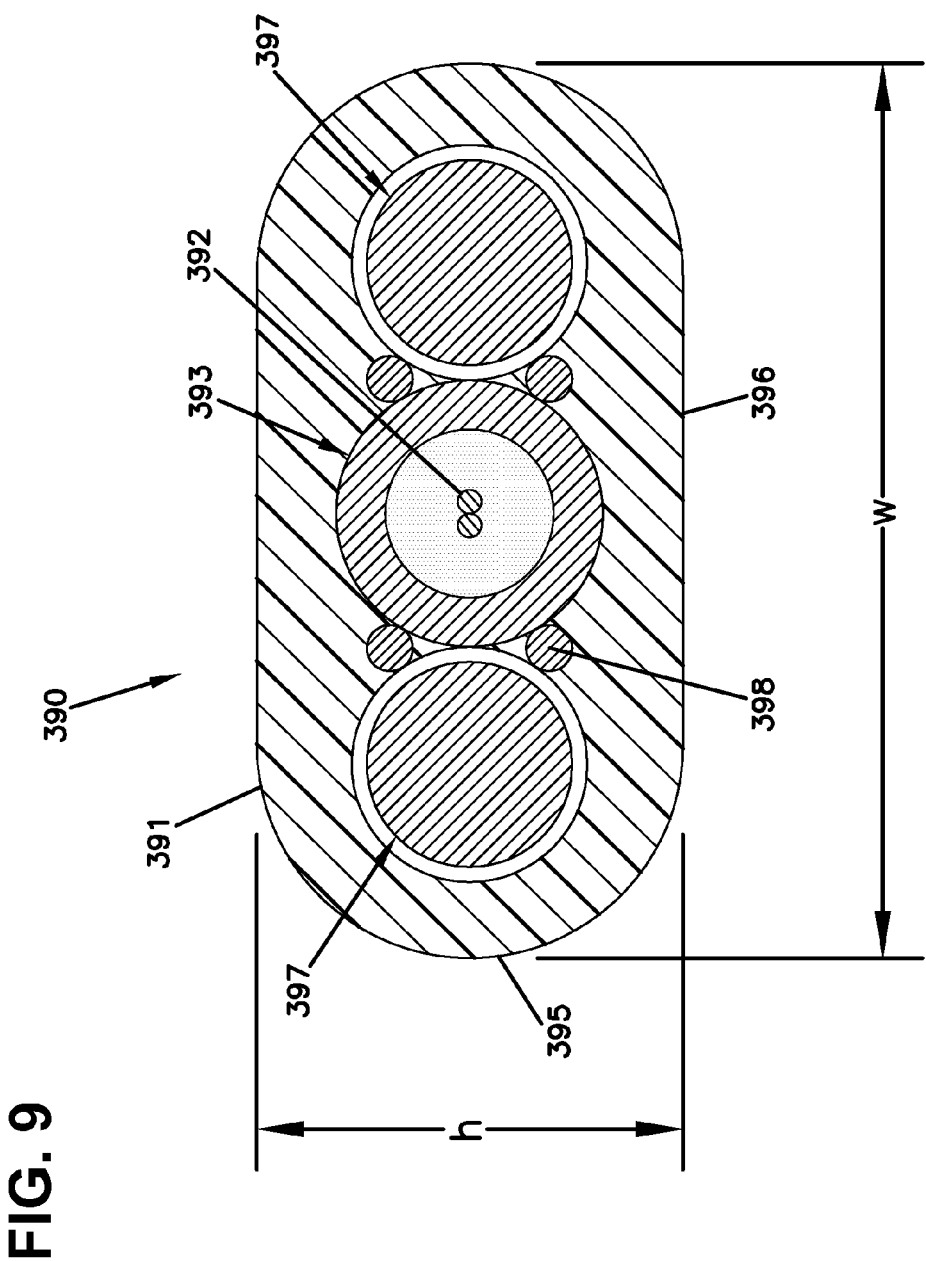
FIG. 9 shows one example implementation of a second cable segment suitable for use as a feeder cable or a subscriber stub cable described herein.

FIG. 9 shows one example implementation of a second cable segment 390 suitable for use as a feeder cable 300 or a subscriber stub cable 308 described herein. The second example cable 390 includes a cable jacket 391 enclosing at least one optical fiber 392. In one implementation, the optical fiber 392 is loosely received within a buffer tube 393. Preferably, buffer tube 393 includes at least one waterblocking substance, for example, a gel, grease, and/or a superabsorbent material. In some implementations, the second example cable 390 has a generally flat configuration. For example, the jacket 391 can define generally arcuate sections 395 and generally flat-sided sections 396. Other implementations of the second example cable 390, however, can have round, oval, or other transverse cross-sectional profiles.

The second example cable 390 also includes at least one strength component 397. In the example shown in FIG. 9, the optical transmission component 392 is disposed between two strength components 397. In other implementations, however, greater or fewer strength components 397 can be used. In accordance with certain aspects, the strength components 397 have both tensile and anti-buckling characteristics. In some implementations, the strength components 397 are solid, rod-like members formed of dielectric materials. For example, in one implementation, a strength component 397 includes glass filaments impregnated and bonded together with a resin to define a single unit having a tensile strength rating of about 500 Newtons @0.5% strain.

In some implementations, the second example cable 390 can include one or more tensile strength members 398 (e.g., a group of fiberglass strands). In other implementations, however, the strength components 397 provide the tensile strength of the second example cable 390. Additional details regarding the example second example cable 390 can be found in U.S. Pat. No. 6,542,674, titled "Fiber Optic Cables with Strength Members," and issued Apr. 1, 2003 to Corning Cable Systems, LLC, the disclosure of which is hereby incorporated by reference herein. Of course, other types of fiber optic cables having different tensile strength and flexibility characteristics can be used as the second cable segment.

Figure 10:
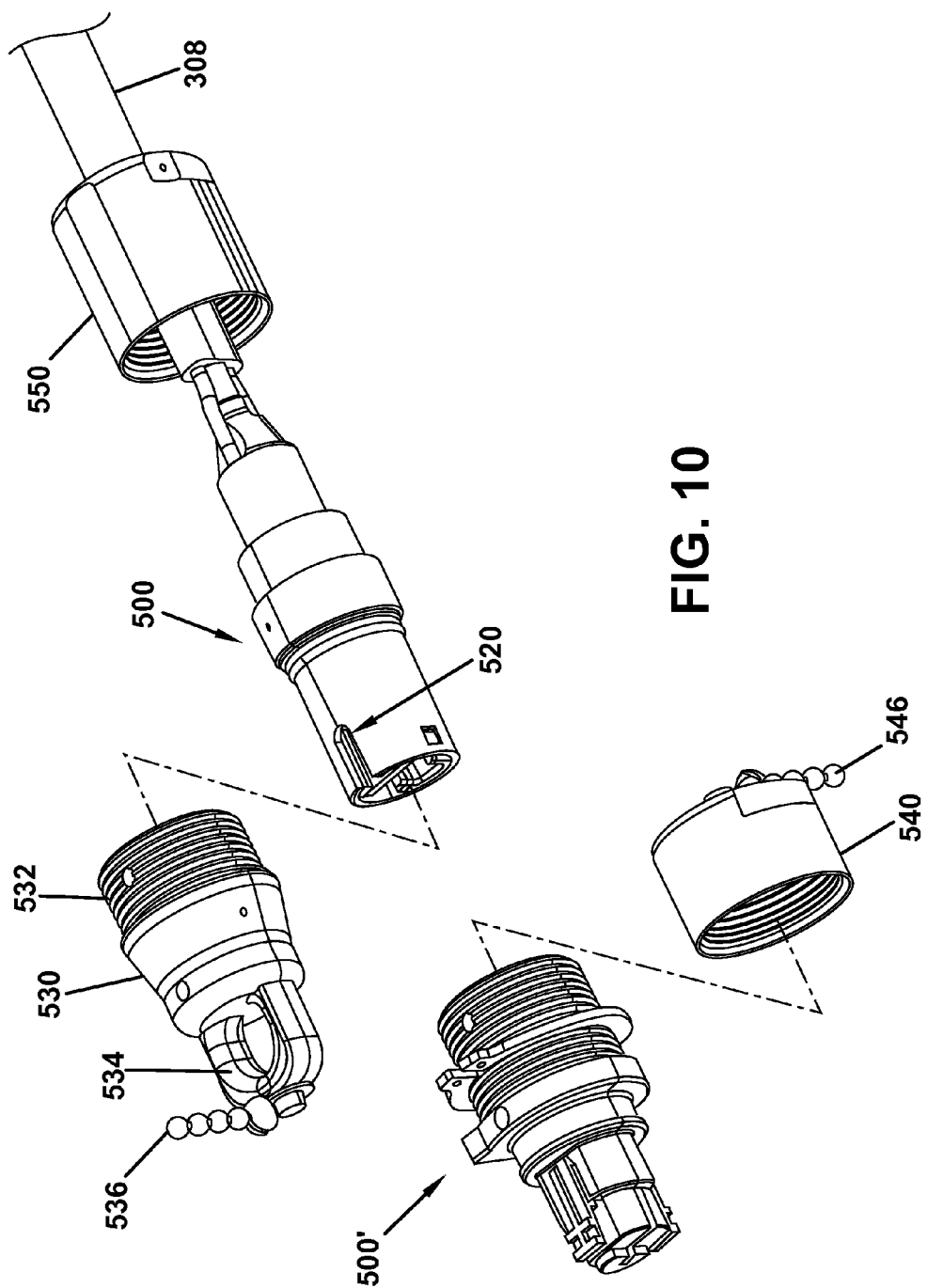
FIG. 10 shows an example plug connector and an example receptacle connector that are configured to interface together in accordance with aspects of the disclosure.
Figure 11:
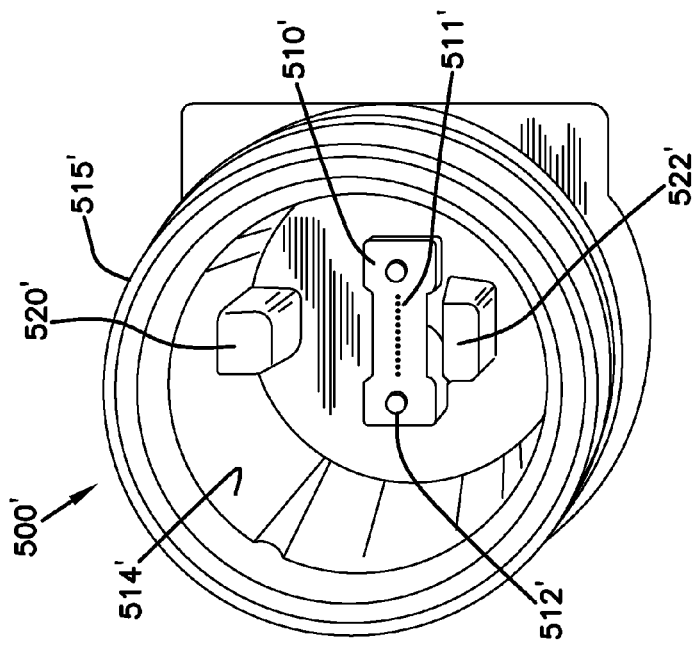
FIGS. 11 and 12 show the ferrules of the plug and receptacle multi-fiber connectors of FIG. 10.
Figure 12:
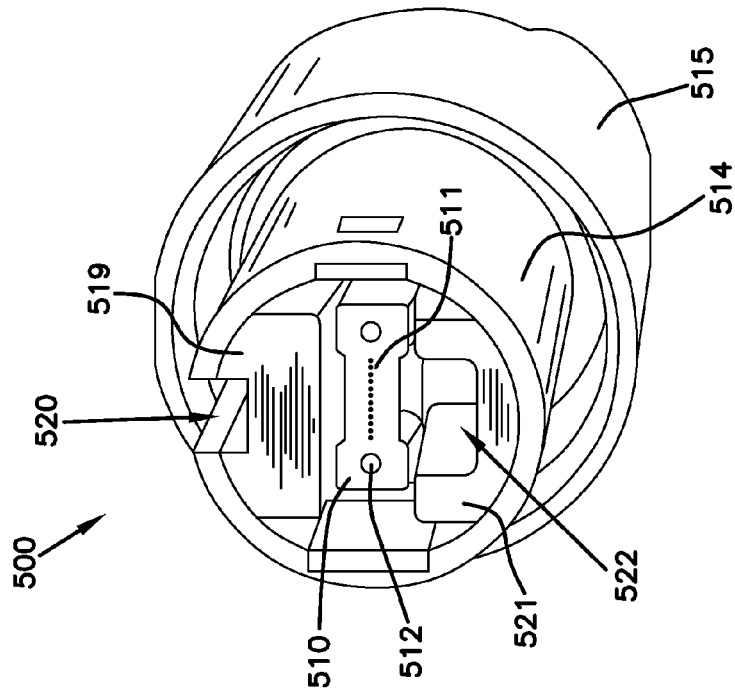

FIGS. 10-12 provide example connectors suitable for terminating the stub ends 309 of the subscriber cables 308, the feeder cables 300, and/or the ends of the cables 320 passing through the conduits 430. The interface end of a first example connector 500 is shown in FIG. 11 and the interface end of a second example connector 500' is shown in FIG. 12. In accordance with some aspects, the first example connector 500 is sized and shaped to couple to the second example connector 500' without an adapter. For example, the first example connector 500 can define a plug and the second example connector 500' can define a receptacle that is configured to receive the plug 500.

FIG. 10 shows the plug 500 disengaged from the receptacle 500'. A threaded coupling nut 550 on the plug 500 is operable for securing the plug 500 to the receptacle 500' upon engagement. As shown in FIG. 11, the connector plug 500 includes a ferrule 510 at which one or more optical fibers 511 are terminated. As shown in FIG. 12, the connector receptacle 500' also includes a ferrule 510' at which one or more optical fibers 511' are terminated. In some implementations, the plug 500 and receptacle 500' are operable for aligning and maintaining the optical fibers of each in opposing relation for transmitting an optical signal. For example, the plug 500 and the receptacle 500' may be threadably coupled together. In accordance with other aspects, however, both the subscriber cables 308 and the conduit cables 320 can be terminated with the same type of connector 500, 500' and can be interfaced at an adapter.

In some implementations, the plug ferrule 510 terminates multiple (e.g., two, eight, twelve, sixteen, twenty-four, forty-eight, seventy-two, etc.) optical fibers 511. In the example shown, the ferrule 510 terminates twelve optical fibers 511. The plug ferrule 510 defines keying openings 512 at either side of the optical fibers 511. The ferrule 510 is enclosed within a shroud 514 that defines keying and latching features. The shroud 514 and ferrule 510 extend forwardly of a connector base 515. The shroud 514 extends beyond the ferrule 510. The shroud 514 defines a first keying channel 520 and a second keying channel 522 above and below the ferrule 510, respectively. Strength members of the cables (e.g., feeder stub cable 300 and subscriber stub cable 308) also may be anchored to the connector plug 500. For example, strength members of the cables may be crimped to a portion of the connector plug 500.

In some implementations, the receptacle ferrule 510' terminates multiple (e.g., two, eight, twelve, sixteen, twenty-four, forty-eight, seventy-two, etc.) optical fibers 511. In the example shown, the receptacle ferrule 510' terminates twelve optical fibers 511'. The receptacle ferrule 510' is enclosed within a connector body 515' defines a cavity 514' that is sized and shaped to receive the shroud 514 of the plug 500. The connector base 515' is configured to surround the shroud 514. In some embodiments, the connector base 515' latches, screws, or otherwise secures to the shroud 514 to retain the plug 500 and the receptacle 500' in a mated configuration.

The receptacle ferrule 510' defines keying projections 512' at either side of the optical fibers 511'. The projections 512' are configured to be inserted into the keying openings 512 of the plug ferrule 510 to facilitate alignment of the ferrules 510, 510'. In addition, a first keying projection 520' and a second keying projection 522' are positioned within the cavity 514' above and below the ferrule 510', respectively. In some implementations, the first and second keying projections 520', 522' have different shapes and/or sizes to facilitate finding the correct orientation of the plug and receptacle. Strength members of the cables (e.g., feeder stub cable 300 and subscriber stub cable 308) also may be anchored to the connector receptacle 500'. For example, strength members of the cables may be crimped to a portion of the connector receptacle 500'.

The rugged housings of both the receptacle and plug provide improved sealing and increased mechanical strength against pulling forces as compared to conventional optical connections. In some implementations, the connectors 500, 500' include an environmental seal when interfaced together to protect the ferrules 511, 511' from dust, dirt, or other contaminants. In some implementations, environmental sealing structures can be mounted to the connectors 500, 500' to protect the ferrules 511, 511' prior to deployment of the FDH 200 or prior to connection of the connectors 500, 500'.

For example, a protective pulling cap 530 is shown exploded from the plug 500 in FIG. 10. The pulling cap 530 defines a threaded portion 532 at its rearward end and a pulling loop 534 at its forward end. The pulling cap 530 provides protection of the optical connector of the plug 500 during shipping and deployment, and until engagement of the plug 500 with the receptacle 500'. The pulling cap 530 may be secured to the cable using a tether 536 so that the pulling cap 530 may be reused if the plug 500 is later disengaged from the receptacle 500'. The coupling nut 550 also may secure the pulling cap 530 to the plug 500 during shipping and deployment of the corresponding cable.

A protective dust cap 540 is shown exploded from the receptacle 500' in FIG. 10. The receptacle 500' may be covered and sealed with a threaded protective dust cap 540 during shipping and deployment. The dust cap 540 is removed prior to inserting the plug 500 into the receptacle 500'. The dust cap 540 may be secured to the receptacle 500' using a tether 546. At the end of the receptacle 500' opposite the dust cap 540, a pre-formed, elastomeric seal boot (not shown) may provide protection for the receptacle 500' from the environment within the connection terminal. The protective boot also may provide a sealing function. The protective boot allows the assembly to be installed in a breathable connection terminal or similar enclosure, and may be unnecessary in the event the receptacle 500' is otherwise reliably sealed from the environment.

Additional details regarding the example connector plug 500 and receptacle 500' can be found in U.S. Pat. No. 7,264,402 to Theuerkorn et al., issued Sep. 4, 2007, and titled "Multi-fiber optic receptacle and plug assembly," the disclosure of which is hereby incorporated by reference herein.

Figure 13:
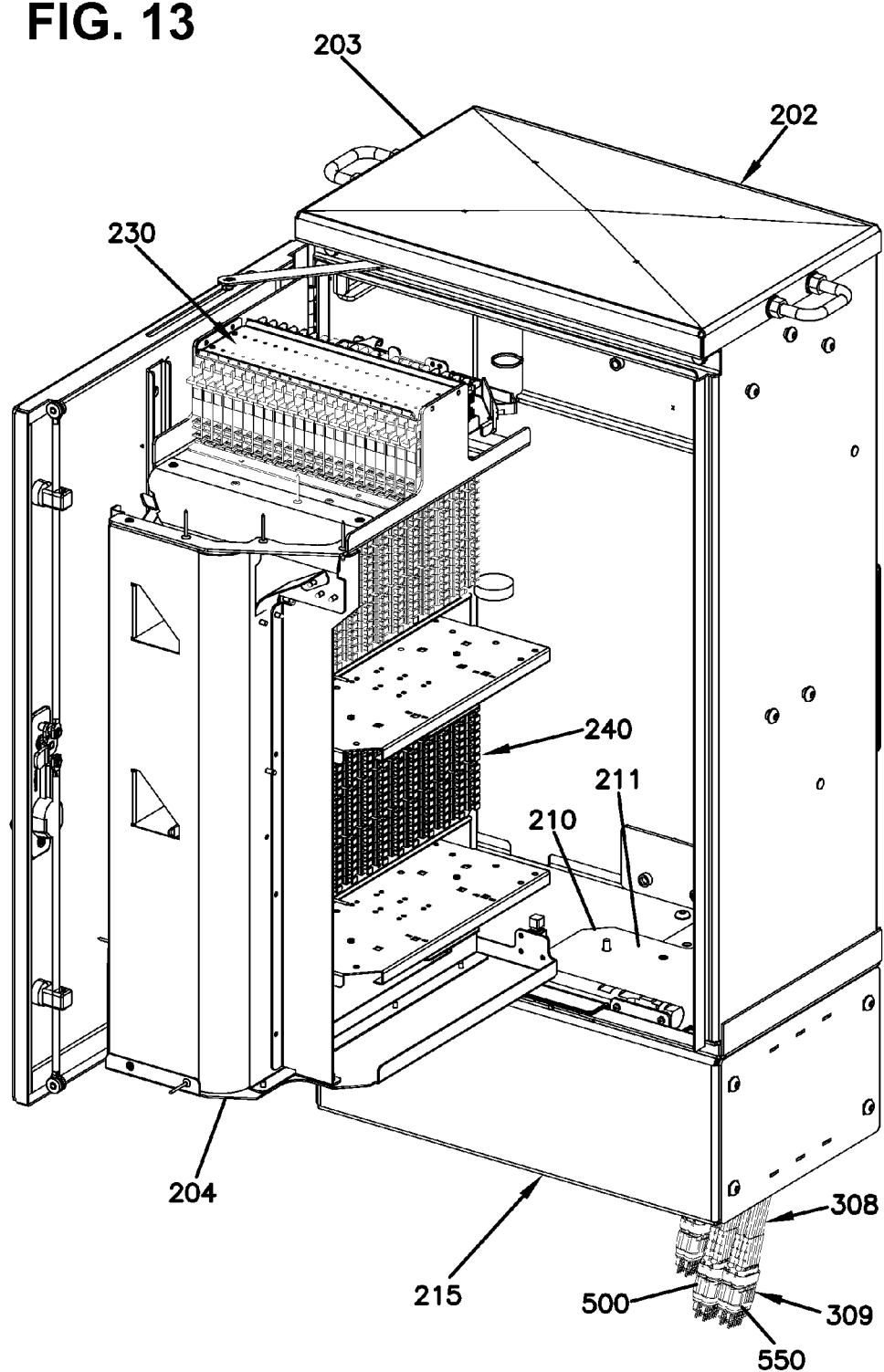
FIGS. 13 and 14 show an example FDH including a moveable frame shown in an open position in accordance with aspects of the present disclosure.
Figure 14:
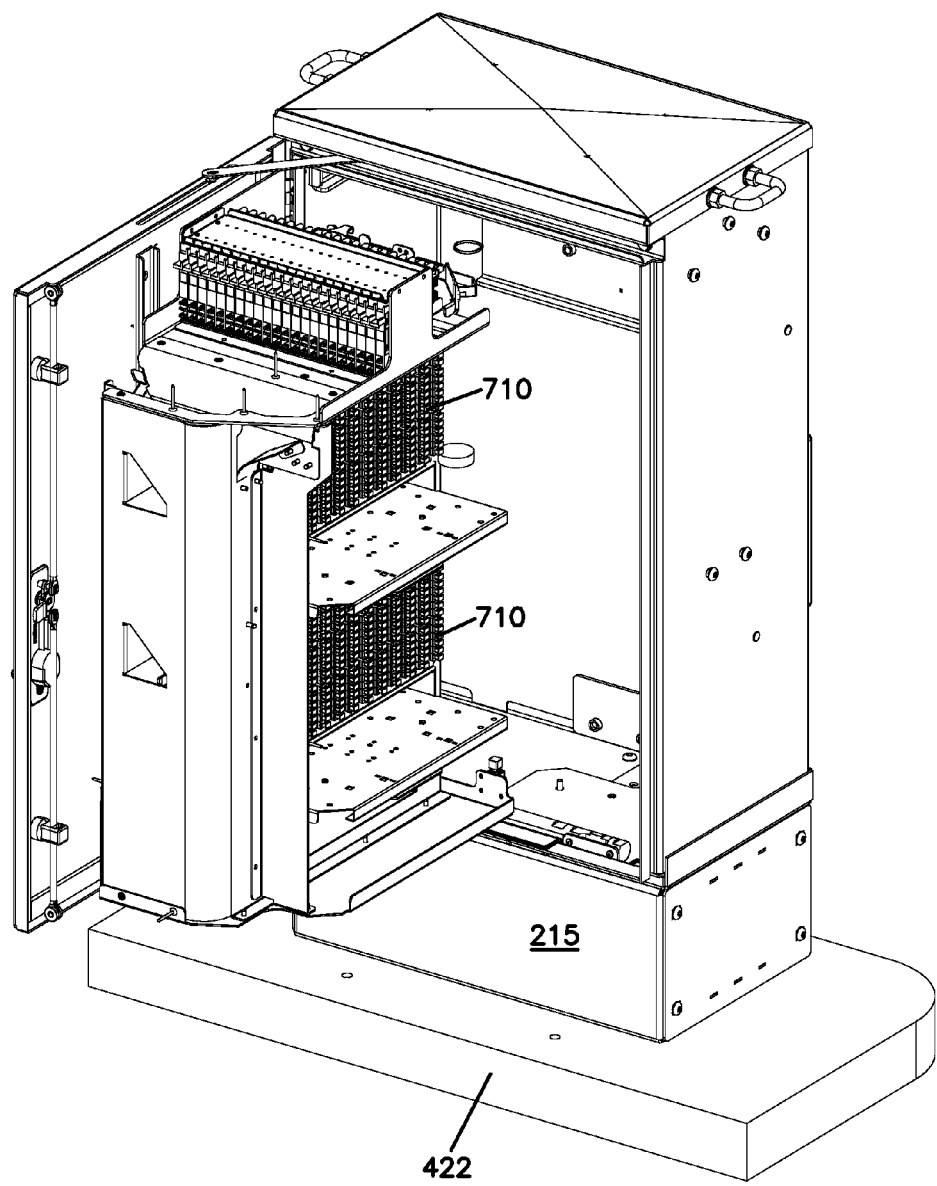

FIGS. 13 and 14 show an example FDH 200 including an example enclosure 202 having a main body 203 and movable frame 204. A splitter region 230, termination region 240, and storage region 250 are located on the frame 204. The frame 204 is shown in an open position to provide access to a back of the enclosure 202. An access panel 211 is shown covering the cable access port 210. The enclosure 202 is shown mounted on the access module 215.

Example distribution cables 308 are shown exiting the access module 215. The stub end 309 of each distribution cable 308 is terminated at a connector (e.g., a multi-fiber connector 500). In the example shown, twenty-four distribution cables 308 are extending outwardly from the access module 215. In the example shown, the distribution cables 308 are shown grouped into six rows that extend four connectors 500 deep. The distribution cables 308 are routed through the cable port 423 in the support platform 422 shown in FIG. 14.

The termination region 240 includes a panel or bulkhead at which one or more termination modules 700 can be mounted. In one embodiment, the termination region 240 includes one or more termination panels, each of which defines openings into which termination modules 700 may be inserted. The termination panels may be incrementally added as the number of subscribers increases.

In general, each termination module 700 includes an adapter 710 (e.g., see FIG. 12). Each end of each adapter 710 is configured to receive a connectorized end of an optical fiber. For example, one end of an adapter 710 may receive the connectorized ends 305 of a splitter pigtail 304 and the opposite end of the adapter 710 may receive a connectorized end 306 of a subscriber fiber 307, thereby coupling the feeder cable 301 to the subscriber cable 308. As noted above, the termination modules 700 can be precabled at the factory to include the connectorized ends 306 of the subscriber fibers 307 plugged into the second ends of the adapters 710. Dust caps may be provided on the first ends of the adapters 710 to protect the connectorized ends 306 of the subscriber fibers 307 from dust, dirt, and other contaminants.

In some implementations, multiple adapters 710 can be arranged into one or more rows at the termination region 240. In the depicted embodiment, each opening 242 in the termination region 240 is configured to receive a single horizontal row of twelve adapters 710. In other embodiments, however, each opening 242 in the termination region 250 may be configured to receive greater or fewer numbers of adapters 710. In one embodiment, each termination module 700 includes a housing defining multiple adapters 710 as a single unit. One example of such a termination module is found in FIGS. 8-10 and the accompanying text of U.S. Pat. No. 7,623,749 to Reagan et al., issued Nov. 24, 2009, and titled "Fiber Distribution Hub with Modular Termination Blocks," the disclosure of which is incorporated herein by reference. In other embodiments, however, each termination module 700 includes only a single adapter 710.

One example storage modules 600 can be found in U.S. Pat. No. 7,198,409 to Smith et al., issued Apr. 3, 2007, and titled "Fiber Optic Connector Holder and Method;" U.S. Pat. No. 7,233,731 to Solheid et al., issued Jun. 19, 2007, and titled "Telecommunications Connection Cabinet;" and U.S. Pat. No. 7,218,827 to Vongseng et al., issued May 15, 2007, and titled "Multi-position Fiber Optic Connector Holder and Method," the disclosures of which are hereby incorporated herein by reference.

One example splitter module 800 is described in U.S. Pat. No. 7,418,181 to Zimmel et al., issued Aug. 26, 2008, and titled "Fiber Optic Splitter Module," which is hereby incorporated by reference herein.

In accordance with some aspects, the connectorized ends 309 of the subscriber cables 308 can be organized in a manager 330 while positioned in the handhole 400. For example, the manager 330 may releasably retain the connectorized ends 309 before the connectorized end are connected to cables 320 within the handhole 400. When a connection is desired, a user may access the handhole 400, release at least one of the connectorized ends 309 from the manager 330 located within the handhole 400, and connect the released connectorized end 309 to one of the network cables 320.

In some implementations, the manager 330 includes a body that is configured to retain each of the MFC connectors 500 of the subscriber cables 308. In other implementations, the manager 330 includes a body that is configured to retain each of the subscriber stub cables 308 at a point adjacent the connectors 500. In one implementation, the manager 330 includes a panel from which fingers project to retain the connectors 500 or the cables 308. In another implementation, the manager 330 includes a housing defining receptacles configured to receive the connectors 500.

Figure 15:
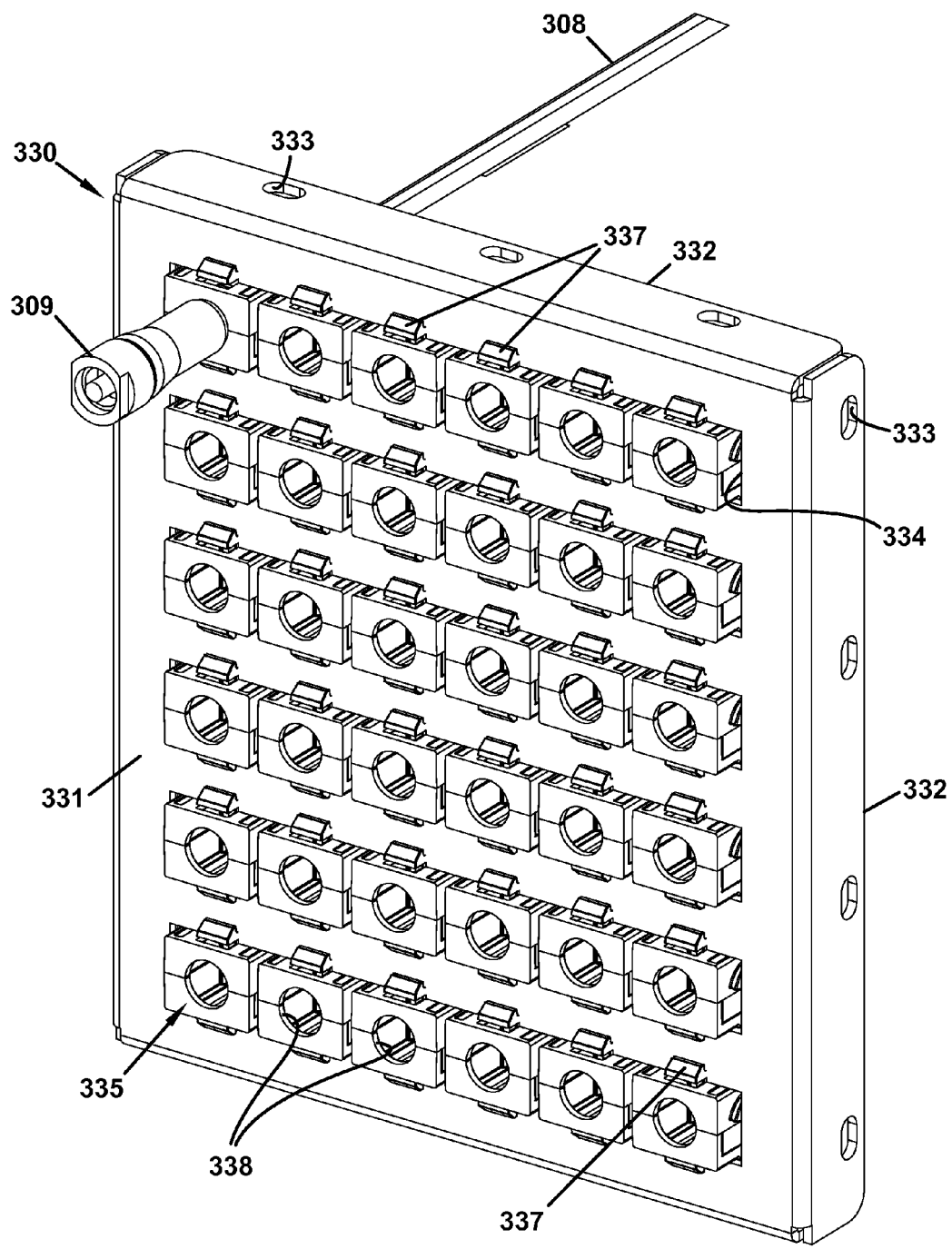
FIG. 15 is a front perspective view of an example manager suitable for retaining the connectorized ends of stub cables within a handhole in accordance with aspects of the present disclosure.
Figure 16:
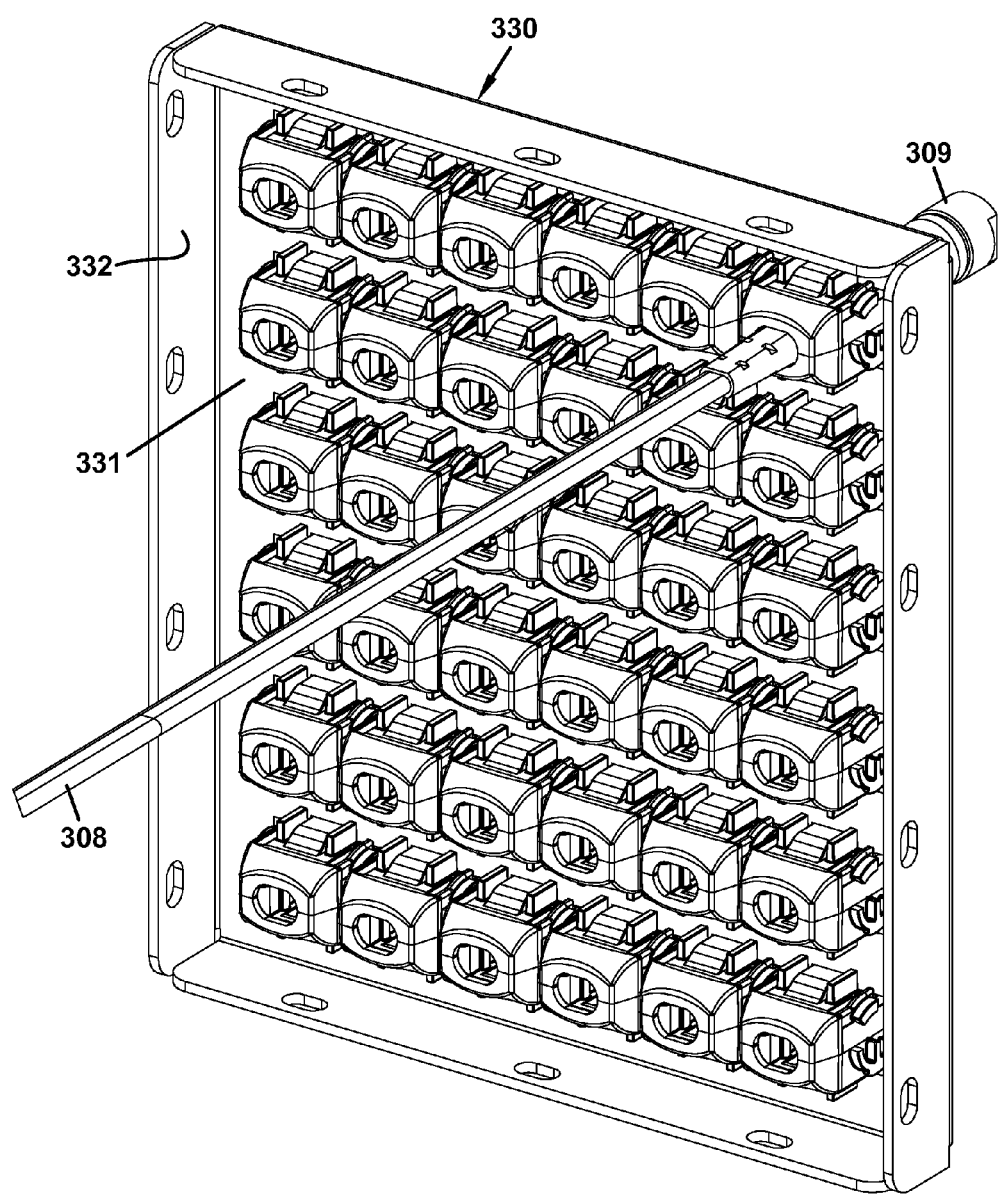
FIG. 16 is a rear perspective view of the example manager of FIG. 15.
Figure 17:
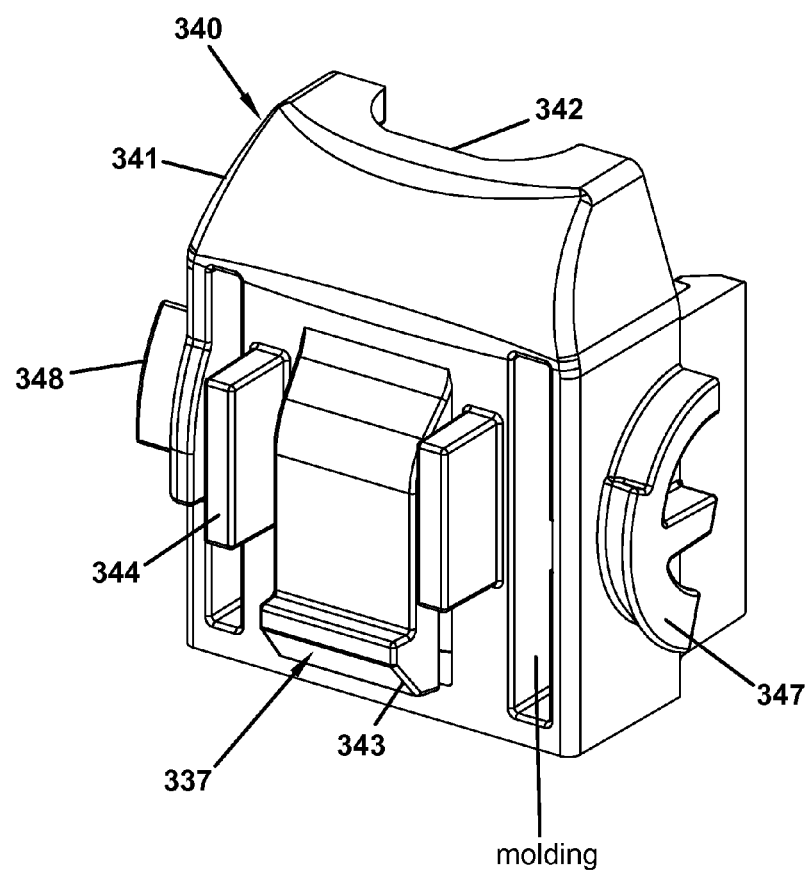
FIGS. 17-23 show various views of one implementation of a housing of an example holder suitable for use with the manager of FIGS. 15 and 16.
Figure 18:
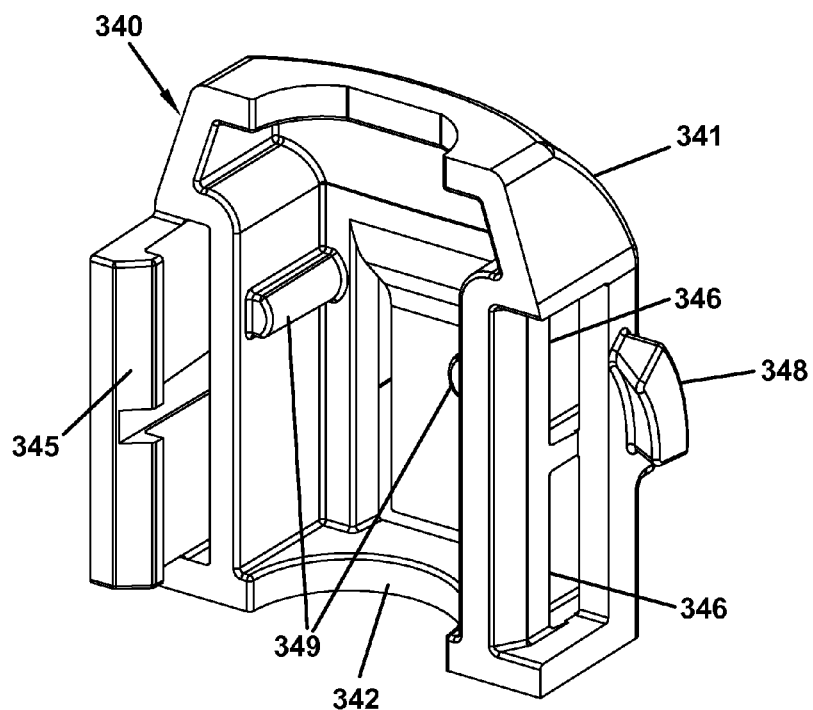
Figure 19:
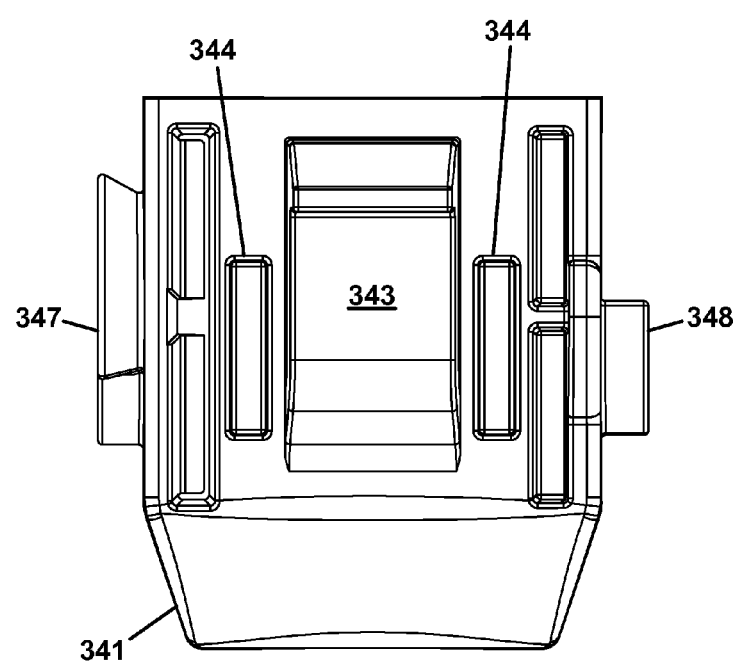
Figure 20:
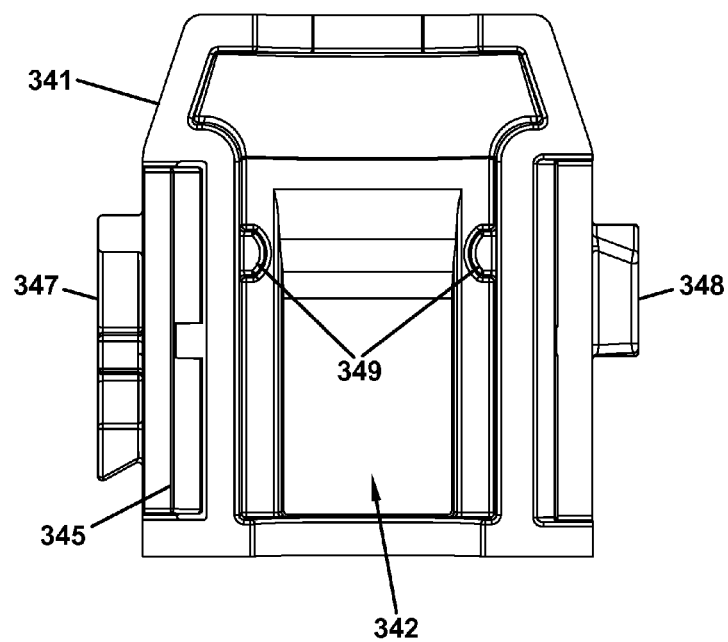
Figure 21:
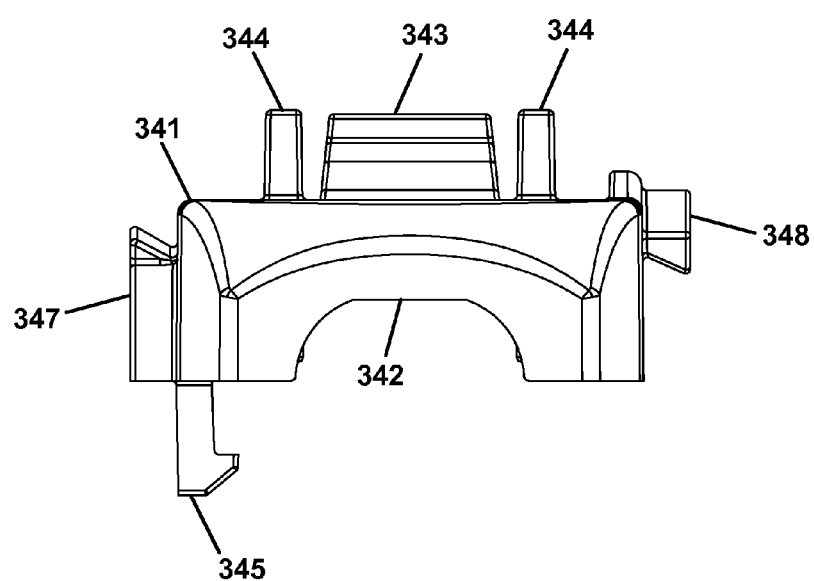
Figure 22:
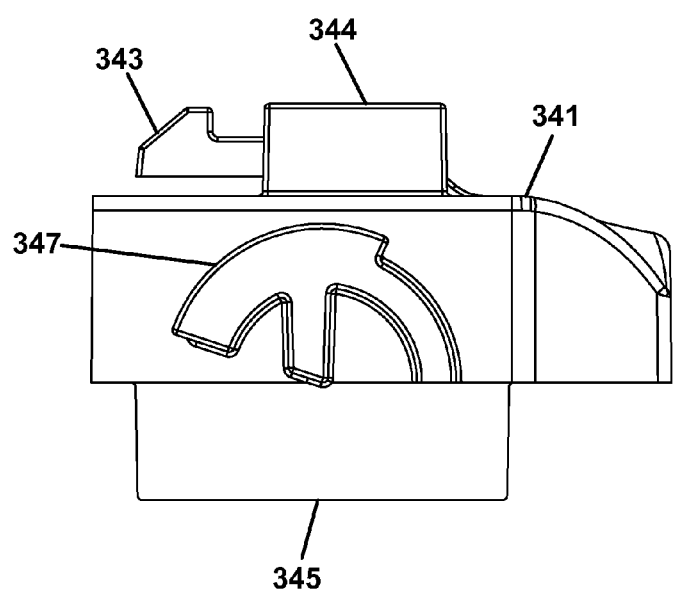
Figure 23:
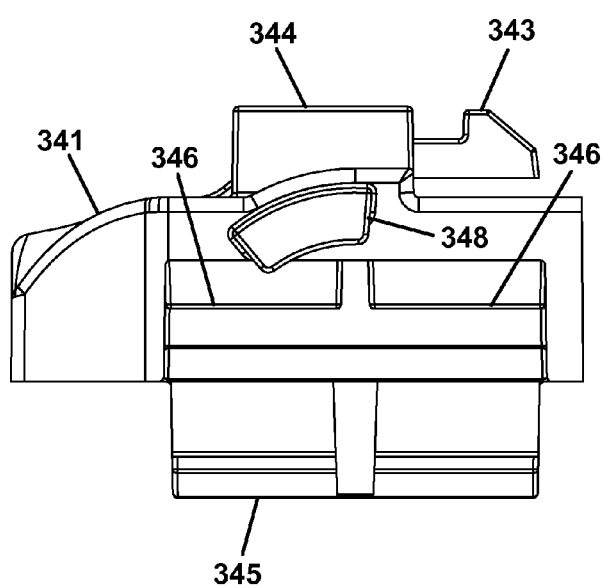

One example implementation of a suitable manager 330 is shown in FIGS. 15 and 16. The manager 330 includes a panel 331 configured to hold one or more connectorized ends 309 of the stub cables. The panel 331 is configured to be mounted within the handhole 400. In some implementations, the panel 331 includes mounting members 332 defining openings 333 through which one or more fasteners may extend to the secure the panel 331 within the handhole 400. In the example shown, the mounting members 332 extend generally perpendicular to the panel 331 so that the manager 330 has a generally U-shaped cross-section.

One or more connector holders 335 are coupled to the panel 331. In some implementations, the panel 331 defines one or more openings 334 at which the holders 335 mount to the panel 331. In some implementations, multiple holders 335 are positioned at each opening 334. In other implementations, only one holder 335 is positioned at each opening 334. At least a portion of each holder 335 may extend through the openings 334. In the example shown, the entire holder 335 extends through the opening 334. In some implementations, each holder 335 defines a latching arrangement 337 that secures the holder 335 to the panel 331. In certain implementations, only the latching arrangement 337 extends through the opening 334.

Figure 24:
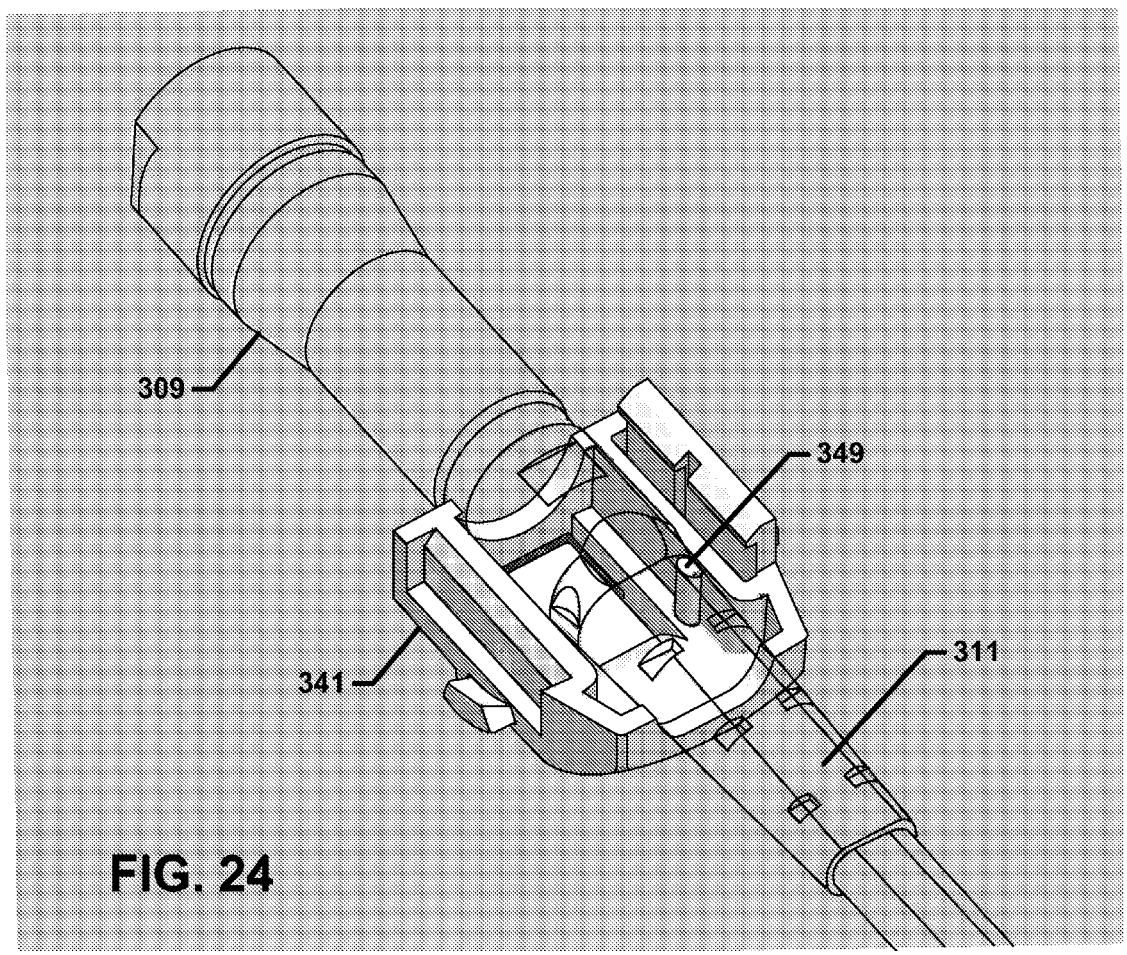
FIG. 24 shows a boot of a stub cable positioned in a channel of a housing part of the example holder of FIGS. 17-23 in accordance with aspects of the disclosure.
Figure 25:
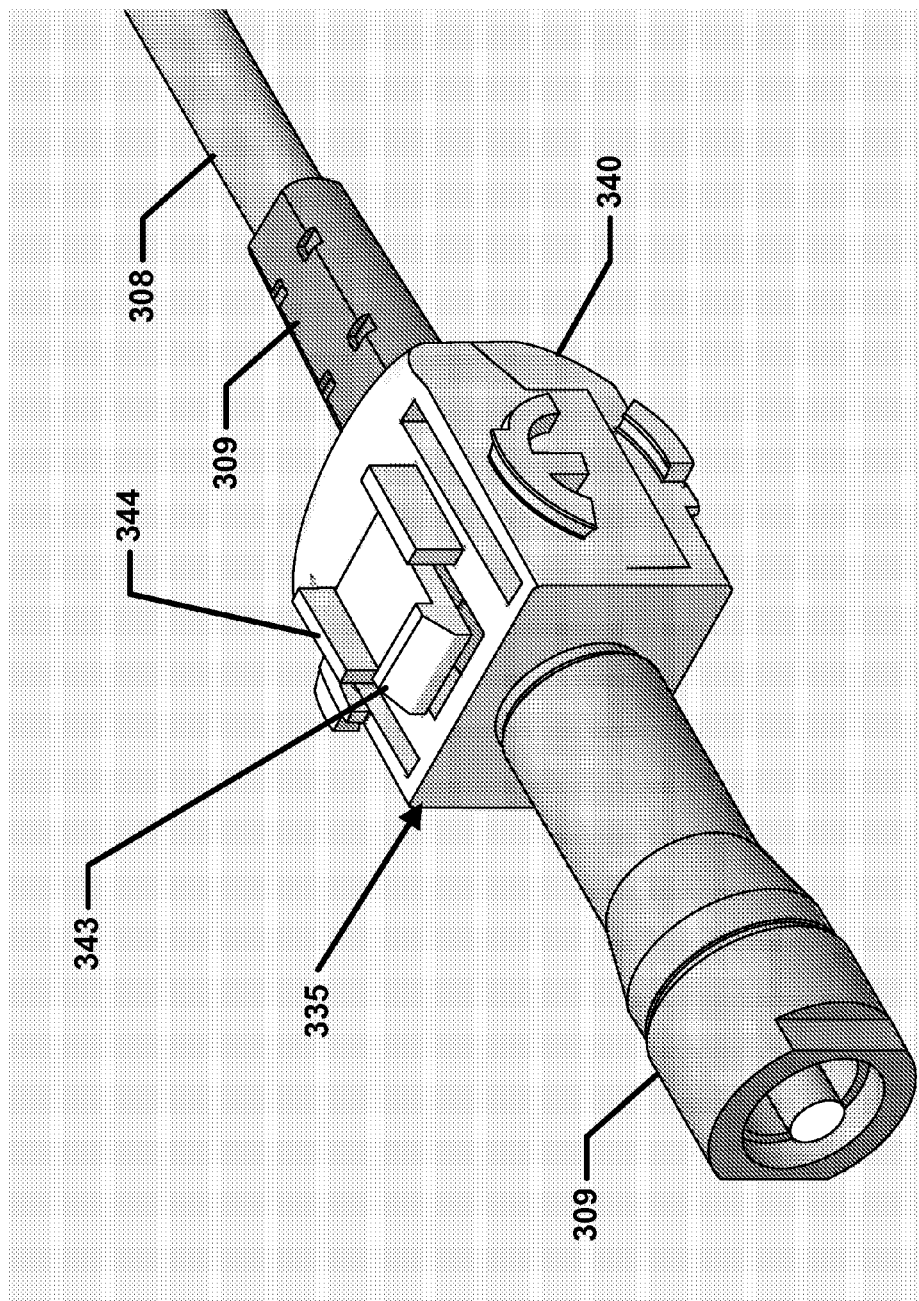
FIG. 25 shows an example holder encircling a boot of a stub cable, the holder being configured to latch to the manager of FIGS. 15 and 16 in accordance with aspects of the disclosure.

Each holder 335 is configured to retain the connectorized end 309 of one or more stub cables located in the handhole 400. For example, each holder 335 may define one or more openings 338 through which a portion of a stub cable (cable 308, cable 300, etc.) or the corresponding connector 500, 500' may extend. In the example shown, each holder 335 defines a single opening 338 through which a stub cable may extend. In other implementations, each holder 335 may define a plurality of openings 338, each holding a stub cable. In some implementations, each holder 335 encircles or otherwise attaches to the connector 500, 500' terminating the stub ending 309. In other implementations, each holder 335 encircles or otherwise attaches to the outer jacket of the stub cable. In certain implementations, each holder 335 encircles or otherwise attaches to the boot 311 or other portion of the stub cable 308 (see FIGS. 24-25).

In accordance with some aspects, each holder 335 is formed from two housing parts that cooperate to define a passage 338 through which a stub cable may extend. For example, FIGS. 17-23 illustrate one example implementation of a suitable housing 340 for a holder 335. In some implementations, the holder 335 is formed by attaching two identical housings 340 together. For example, each housing 340 may include a body 341 defining a channel 342 sized and shaped to accommodate a portion of the connectorized end 309 of a stub cable. When the housings 340 are coupled together, the channels 342 are aligned to form the through-passage 338 of the holder 335.

In certain implementations, fixing members 349 are positioned in the channels 342 to aid in securing the stub cable within the holder 335. For example, the fixing members 349 may be configured to fit with notches or other features defined in the cable. In some implementations, the fixing members 349 inhibit the stub cable from being axially pulled through out of the holder 335. In other implementations, the fixing members 349 inhibit rotation of the stub cable within the holder 335. In the example shown in FIG. 24, the housing body 341 defines a channel 342 configured to accommodate a boot 311 of the stub cable 308. The boot 311 extends from a rounded portion to a partially flattened portion. Accordingly, the channels 342 are configured to define a rounded port at one end of the holder and an obround port at an opposite end of the holder.

Each housing body 341 also includes a latching arrangement 337 that secures the holder 335 to the manager panel 331. The latching arrangement 337 of each housing body 341 includes a latching tab 343 and at least one lug 344. In the example shown, each latching tab 343 resiliently extends from an exterior surface of the housing body 341. A lug 344 is positioned on either side of the second tab 343. When the holder 335 is inserted through the openings 334 in the manger panel 331, the latching tab 343 flexes inwardly to enable insertion of the holder 335 until the lugs 344 abut one side of the panel 331. The latching tab 343 flexes back to hook behind the opposite side of the panel 331, thereby retaining the holder 335 at the panel 331.

In some implementations, each housing body 341 includes at least one attachment tab 345 at one side and at least a first opening 346 at an opposite side. When a first housing body 341 is coupled to a second housing body 341, the first attachment tab 345 of the each housing body 341 cooperates with the first opening 346 of the other housing body 341 to lock the housing bodies 341 together. In the example shown, the first attachment tab 345 defines a notch that accommodates a wall between adjacent openings 346 in the housing body 341.

In accordance with some aspects, each holder 335 is configured to attach to one or more adjacent holders 335. In some implementations, multiple holders 335 attach together without a panel 331 or other manager. For example, in some implementations, first and second side members 347, 348 extend outwardly from opposite sides of the housing body 341. The first and second side members 347, 348 are configured to cooperate to define an attachment arrangement that fits with an identical attachment arrangement on an adjacent holder 335.

The above specification, examples and data provide a complete description of the manufacture and use of the invention. Since many embodiments of the invention can be made without departing from the spirit and scope of the invention, the invention resides in the claims hereinafter appended.

What is claimed is:

1. A fiber distribution hub comprising:
an enclosure;
a splitter region positioned within the enclosure, the splitter region including at least one splitter;
a termination region positioned within the enclosure, the termination region including a plurality of adapters;
at least a first feeder cable routed into the enclosure, the feeder cable including at least one optical fiber that is optically coupled to the splitter at the splitter region;
a plurality of subscriber stub cables routed into the enclosure, the subscriber stub cables each including at least two optical fibers that each have a connectorized end inserted into one of the adapters at the termination region, the subscriber stub cables each being terminated at a remote end by a single, ruggedized multi-fiber connector, the remote end being located outside of the enclosure, wherein the ruggedized multi-fiber connector is shaped and sized to couple to another ruggedized multi-fiber connector without an adapter;
and a manager configured to releasably retain the connectorized ends of the subscriber stub cables while the connectorized ends are located within a handhole spaced from the enclosure.

2. The fiber distribution hub of claim 1, wherein the first feeder cable also is a stub cable terminated at a remote end by a multi-fiber connector.

3. The fiber distribution hub of claim 1, wherein the subscriber stub cables each extend about five to ten feet out from the enclosure.

4. The fiber distribution hub of claim 1, wherein the manager includes a housing defining receptacles configured to receive the multi-fiber connectors.

5. The fiber distribution hub of claim 1, wherein the subscriber stub cables total about twenty-four subscriber stub cables.

6. The fiber distribution hub of claim 1, wherein the manager includes an array of storage locations configured to hold at least twenty-four subscriber stub cables.

7. The fiber distribution hub of claim 1, wherein the manager includes a panel from which fingers project.

8. The fiber distribution hub of claim 7, wherein the fingers are configured to retain the multi-fiber connectors.

9. The fiber distribution hub of claim 7, wherein the fingers are configured to retain the subscriber stub cables.

10. A fiber distribution hub comprising:
an enclosure;
a splitter positioned within the enclosure;
a termination region positioned within the enclosure, the termination region including a plurality of adapters;
at least a first feeder cable routed into the enclosure, the feeder cable including at least one optical fiber that is optically coupled to the splitter;
a plurality of subscriber stub cables routed into the enclosure, each subscriber stub cable extending a distance of no more than about ten feet, each subscriber stub cable including at least two optical fibers and at least one strength member;

a plurality of ruggedized multi-fiber connectors terminating the subscriber stub cables, each of the ruggedized multi-fiber connectors anchoring the strength member of the respective subscriber stub cable, wherein each of the ruggedized multi-fiber connectors are shaped and sized to couple to a second ruggedized multi-fiber connector without an adapter; and a manager configured to releasably retain the connectorized ends of the subscriber stub cables while the connectorized ends are located within a handhole spaced from the enclosure.

11. The fiber distribution hub of claim 10, wherein the plurality of subscriber stub cables includes twenty-four subscriber stub cables.

12. The fiber distribution hub of claim 10, wherein the first feeder cable is a stub cable terminated at a remote end by a multi-fiber connector.

13. The fiber distribution hub of claim 10, wherein the manger includes a body configured to hold each of the multi-fiber connectors.

14. The fiber distribution hub of claim 10, wherein the manger includes a body configured to hold each of the subscriber stub cables adjacent the multi-fiber connectors.

15. The fiber distribution hub of claim 10, wherein each of the subscriber stub cables extends at least five feet.

16. A cable assembly comprising:

a plurality of cables including first ruggedized connector ends; and a manager configured to releasably retain the first ruggedized connector ends of the plurality of cables;

wherein at least one of the first ruggedized connector ends of the plurality of cables is sized and shaped to connect with a second ruggedized connector end without an adapter, wherein the first and second ruggedized connector ends are connected to each other while being held by the manager.

* * * * *